United States Patent [19]

Larson et al.

[11] Patent Number: 4,577,308

[45] Date of Patent: Mar. 18, 1986

[54] MULTIPLEXED INTERCONNECTION OF PACKET SWITCHING NODE PACKAGES

[75] Inventors: Mikiel L. Larson, St. Charles; Wing N. Toy, Glen Ellyn, both of Ill.

[73] Assignee: AT&T Bell Laboratories, Murray Hill, N.J.

[21] Appl. No.: 597,508

[22] Filed: Apr. 6, 1984

[51] Int. Cl.$^4$ ........................ H04J 15/00; H04J 11/04
[52] U.S. Cl. ........................................... 370/9; 370/58
[58] Field of Search .................. 370/9, 58, 63, 60, 94; 375/22

[56] References Cited

U.S. PATENT DOCUMENTS

| | | | |
|---|---|---|---|
| 3,274,340 | 9/1966 | Balderston et al. | 179/15 |
| 3,983,330 | 9/1976 | Tongi | 179/15 AT |
| 4,074,077 | 2/1978 | Charransol et al. | 370/63 |
| 4,123,624 | 10/1978 | Gagnier et al. | 179/15 |
| 4,498,166 | 2/1985 | Esposito et al. | 370/9 |
| 4,506,358 | 3/1985 | Montgomery | 370/60 |

FOREIGN PATENT DOCUMENTS

| | | |
|---|---|---|
| 2515695 | 10/1975 | Fed. Rep. of Germany . |
| WO84/00265 | 1/1984 | PCT Int'l Appl. . |
| 1152452 | 5/1969 | United Kingdom . |

OTHER PUBLICATIONS

R. Rettberg et al., "Development of a Voice Funnel System: Design Report", Bolt Beranek and Newman, Inc., Aug. 1979, pp. I-7 to 11 and III-43 to 44.
R. J. Stetson, "Biaxial Modulators Double Data-System Transfer Rate", *Electronics*, May 25, 1978, pp. 146-150.
J. Mann, "One-Shot and Counter Multiplex Pulse--Width Encoders", *Electronics*, Mar. 30, 1978, pp. 108-109.
D. M. Dias et al., "Analysis and Simulation of Buffered Delta Networks", *IEEE Transactions on Computers*, vol. C-30, No. 4, Apr. 1981, pp. 273-282.
E. Szurkowski, "The Use of Multi-Stage Switching Networks in the Design of Local Network Packet Switches", *IEEE International Conference on Communications*, vol. 2, pp. 25.2.1-25.2.5, (1981).
H. J. Siegel et al., "The Multistage Cube: A Versatile Interconnection Network", *Computer*, V. 14, No. 12, (Dec. 1981), pp. 65-76.

*Primary Examiner*—Douglas W. Olms
*Assistant Examiner*—Frank M. Scutch, III
*Attorney, Agent, or Firm*—David Volejnicek

[57] ABSTRACT

A packet switching network (100) comprises switching nodes (220-222, 230-232, 240-242, 250-252, 260-262, and 270-272) residing on circuit packs (101-104), that are interconnected by packet signal transmission links (110-119, 140-149, 150-159, and 180-189) carrying multiplexed pulse-width modulated signals (450) each representing three bits. A link (112) incoming to a pack (101) connects to an input port (2821) of a demultiplexer (282), whose output ports (2822-2824) are coupled to packet inputs (2401, 2411, 2421) of three nodes (240-242). The incoming signal stream is demultiplexed into three serial signal substreams. Each substream is transmitted to a node for switching. A link (122) outgoing from a pack (101) connects to an output port (2871) of a multiplexer (287) whose input ports (2872-2874) are coupled to the packet outputs (2703, 2713, 2723) of three nodes (270-272). The three incoming serial signal substreams are multiplexed into a signal stream that is transmitted on the link.

For multiplexed signals representing the bits of a single packet, (FIGS. 2a-c), the acknowledgment output (2405) of one node (240) coupled to a demultiplexer (282) is connected to the incoming link (112) and the acknowledgment input (2707, 2717, 2727) of each node (270-272) coupled to a multiplexer (287) is connected directly to the outgoing link (122).

For multiplexed signals representing the bits of three packets, (FIGS. 3a-c), acknowledgment outputs (2405, 2415, 2425) of the nodes (240-242) that are coupled to a demultiplexer (282) are coupled through a multiplexer (294) to the incoming link (112). Acknowledgment inputs (2707, 2717, 2727) of the nodes (270-272) that are coupled to a multiplexer (287) are coupled through a demultiplexer (291) to the outgoing link (122). Coupling of a packet and acknowledgment input and output pair to a demultiplexer and a multiplexer is made by a lock (246) which alternately makes one connection while it breaks the other connection. The locks that connect to a multiplexer and demultiplexer pair operate in unison.

16 Claims, 14 Drawing Figures

MULTIPLEXED INTERCONNECTION OF PACKET SWITCHING NODE PACKAGES

TECHNICAL FIELD

This invention relates to packet switching systems, and to a multiplexed arrangement of switching nodes in such systems.

BACKGROUND OF THE INVENTION

A packet switching communication system comprises a plurality of communicating devices, such as computers, terminals, telephones, or data sets (referred to as hosts), that are interconnected for communication through a plurality of switching networks. Interconnection of the hosts to the switching networks, and of the switching networks to each other, is commonly accomplished by means of communication trunks. The trunks are coupled at each end either to a host by a host interface or to a switching network by a trunk controller. The switching networks generally comprise a plurality of switching nodes that function to connect communications incoming on a trunk to the appropriate one of a number of outgoing trunks, depending upon the destination of the communication. Such packet switching systems are well-known in the art. A representative packet switching system is disclosed in U.S. Pat. No. 4,491,945, to J. S. Turner, entitled "Fast Packet Switch", filed on June 25, 1982, and assigned to the same assignee as this application.

Each switching node is the basic switching element of a packet switching network. The design and characteristics of nodes vary widely from system to system. However, a common type of node has two serial signal inputs and two serial signal outputs. A packet of serial signals arriving at a node input is generally buffered within the node. Based on address information carried by the packet, the packet signal stream is then directed to either one of the two node outputs.

In multi-node packet networks, the outputs of some nodes are connected in regular patterns to inputs of other nodes to form a node matrix, or array. This array of interconnected nodes constitutes the switching fabric, or switching body, of a switching network.

The switching nodes that constitute a switching network are generally distributed over a plurality of circuit packages. To connect the outputs of nodes of one circuit package to the inputs of nodes of another circuit package, the packages are interconnected for communication by communication links. For example, the electronic components of the nodes are mounted on a plurality of circuit boards, or cards. The circuit cards are then plugged into a backplane, whose conductors serve to interconnect the cards.

As miniaturization of circuit components progresses, through techniques such as large-scale or very large-scale integration of semiconductor circuits, more and more nodes may be fitted into a single circuit package. Circuit miniaturization has many benefits such as reduced device size, lower device power dissipation, improved performance due to reduced signal propagation delays, and lower cost. But as a consequence of greater circuit densities, increasingly larger numbers of input and output signal contact positions, such as contact pins, are required on each circuit package to provide for the requisite interconnection thereof with other circuit packages. In the current technology, the contacts take up significant amounts of space in a circuit package relative to the space occupied by the circuitry. A circuit package is therefore often limited in the number of nodes that it can contain by the maximum number of contacts that can be made to the package. Hence, conservation of contacts is important, and keeping the number of necessary contacts to a minimum is a principal circuit design objective.

A further limitation imposed on packet switching system design by current technology is the speed of operation of the switching nodes. The operational speed of the nodes is constrained by technology of the logic that is used to implement the nodes, such as transistor-transistor logic (TTL) technology or complementary metal oxide semiconductor (CMOS) logic technology. The operational speed of the nodes in turn constrains the throughput of the switching networks and hence limits the performance of the switching system as a whole. Improvements in the effective speed of operation of switching nodes can therefore improve the performance of the whole switching system. However, any contemplated improvements in the speed of operation of the node must heed other constraints, such as the above-described limitations on the number of contacts available on a circuit package.

In summary then, the prior art has achieved integration of a plurality of switching nodes into a single circuit package only with use of an undesirably large number of contacts to the circuit package. Furthermore, the art has been limited in switching network throughput by the switching speed of individual switching nodes.

SUMMARY OF THE INVENTION

It is these and other disadvantages and constraints of the prior art that this invention is directed to alleviating. According to the invention, an arrangement for connecting switching nodes to signal transmission links minimizes the number of contacts required for the connection. The arrangement preferably forms a single circuit package. A switching network comprises at least one such arrangement of switching nodes and a plurality of signal transmission links connected thereto. The links carry multiplexed signal streams. A multiplexed signal stream incoming to the arrangement is demultiplexed by a demultiplexer into a plurality of signal substreams. The substreams are transmitted to inputs of a plurality of switching nodes. Each node switches a substream that it receives to one of its plurality of outputs. A multiplexer receives a plurality of signal substreams from outputs of a plurality of switching nodes and multiplexes therefrom a multiplexed signal stream outgoing from the arrangement.

Advantageously, the invention allows the circuit density of a circuit package, i.e., the number of switching nodes in a package, to be increased without use of an undesirably large number of input or output contacts to the circuit package. Alternatively, the invention either allows the number of input and output contacts of a circuit package to be minimized, or allows many of these contacts to be used for other purposes, such as maintenance and diagnostic functions, without decreasing the circuit density of a package.

The signals of the multiplexed signal stream are advantageously pulse-width modulated signals each carrying the values of a plurality of bits. Such a multiplexing scheme provides an effective and simple manner of combining and transmitting the values of a plurality of bits in one signal.

The bits whose values are carried by a multiplexed signal may belong either to the same packet or to different packets. The former case allows the effective operating speed of nodes to be increased, by up to orders of magnitude, with the use of current-technology logic to implement the nodes and yet without the use of an undesirably large number of input or output contacts to the node circuit package.

According to the invention, the arrangement for connecting switching nodes to signal transmission links is characterized as follows. The arrangement includes a plurality of signal switching nodes. Each node has at least one signal input and a plurality of signal outputs. The arrangement also includes at least one demultiplexer. Each demultiplexer has an input port connected to a link for receiving a stream of signals. Each demultiplexer also has a plurality of output ports each coupled to an input of a node. The demultiplexer demultiplexes the received stream into a plurality of substreams and transmits a substream to each node input coupled thereto. The arrangement further includes at least one multiplexer. Each multiplexer has a plurality of input ports each coupled to an output of a node. The multiplexer receives from each node output coupled thereto a signal substream. The multiplexer also has an output port connected to a link. The multiplexer multiplexes the received signal substreams into a signal stream and transmits the multiplexed signal stream on the link.

According to one disclosed embodiment of the invention, a circuit pack of a packet switching network that includes at least one circuit pack and a plurality of signal transmission links connected to the at least one pack comprises a plurality of the following elements: packet switching nodes, demultiplexers, and multiplexers. The switching nodes form a plurality of node sets. The nodes of each set operate in parallel. Each node has a plurality of inputs and a plurality of outputs. Each node selectively switches connections between its inputs and outputs. The inputs and outputs of the nodes of a set form a plurality of input sets and output sets, respectively. Certain sets of nodes have the sets of outputs connected to the sets of of inputs of other sets of nodes to form a packet switching matrix.

Each demultiplexer has an input port connected to a link for receiving therefrom a signal stream. Each demultiplexer also has a plurality of output ports coupled to a set of inputs of a set of nodes for transmitting to each coupled input a signal substream. The signal substreams are demultiplexed by the demultiplexer from the received signal stream.

Each multiplexer has a plurality of input ports coupled to a set of outputs of a set of nodes for receiving from each coupled output a signal substream. The multiplexer also has an output port connected to a link for transmitting thereon a signal stream. The signal stream is multiplexed by the multiplexer from the received signal substreams.

At least one node of each set of nodes that is coupled to a demultiplexer has an acknowledgement output for transmitting thereon acknowledgement signals. Acknowledgement signals indicate readiness of the node to receive a signal substream. The acknowledgement output or outputs are coupled to the link that connects to the demultiplexer. The nodes of each set of nodes that are coupled to a multiplexer have an acknowledgement input for receiving thereon acknowledgement signals. The acknowledgement input or inputs are coupled to the link that connects to the multiplexer.

In this manner, each circuit pack need provide signal input and output contacts for only one link to receive or transmit a plurality of signal substreams, as opposed to providing separate contacts for receiving or transmitting each signal substream. In the case where each signal of the multiplexed signal stream represents values of a plurality of bits of a single packet, this arrangement increases the effective speed at which packets are switched through the network beyond the operational speed of a single node, in addition to the other enumerated advantages.

According to another disclosed embodiment of the invention, a circuit pack of a packet switching network that includes at least one circuit pack and a plurality of signal transmission links connected to the at least one pack comprises a plurality of the following elements: packet switching nodes, demultiplexers, multiplexers, and locks. Each of the nodes has at least one input of a first kind—preferably a packet signal input. Associated therewith is at least one output of a second kind—preferably an acknowledgement signal output. Each of the nodes further has a plurality of outputs of a first kind—preferably packet signal outputs. Associated therewith is a plurality of inputs of a second kind—preferably acknowledgement signal inputs. The inputs of the first kind and the outputs of the second kind of certain nodes are connected to the outputs of the first kind and the inputs of a second kind, respectively, of other nodes, thereby forming a packet switching matrix.

Each demultiplexer has an input port connected to a link for receiving a stream of signals thereon. Each demultiplexer also has a plurality of output ports each coupled to an input of a node. All output ports of a demultiplexer are coupled to one kind of outputs of the first and the second kinds of outputs. The demultiplexer demultiplexes a received signal stream into a plurality of signal substreams and transmits each substream to a coupled node input.

Each multiplexer is associated with one of the demultiplexers. Each multiplexer has a plurality of input ports. Each input port is coupled to an output of a node whose input is coupled to an output port of the associated demultiplexer. All input ports of a multiplexer are coupled to the other kind of outputs of the first and the second kinds of outputs than the associated demultiplexer. Each multiplexer further has an output port connected to the link that connects to the associated demultiplexer. The multiplexer receives from each coupled node output a signal substream. It multiplexes the received substreams into a multiplexed signal stream and transmits the stream on the connected link.

The locks form a plurality of sets of locks. The locks of a set act in unison. Each lock of a set connects an output port of one demultiplexer to a node input of one kind alternately with connecting a node output of the other kind to the multiplexer associated with the one demultiplexer.

In this manner, each circuit pack need provide signal input and output contacts for only one link to receive and transmit a plurality of signal substreams that are included as signal stream, as opposed to providing separate contacts for receiving and transmitting each of those signal substreams. In addition to the other enumerated advantages, this arrangement enables transmission of a plurality of packets in parallel over the links, by allowing each signal of the multiplexed signal stream to represent values of a plurality of bits of different packets.

These and other advantages and features of the present invention will become apparent from the following description of the illustrative embodiments of the invention taken together with the drawing.

DETAILED DESCRIPTION

Figure 1:
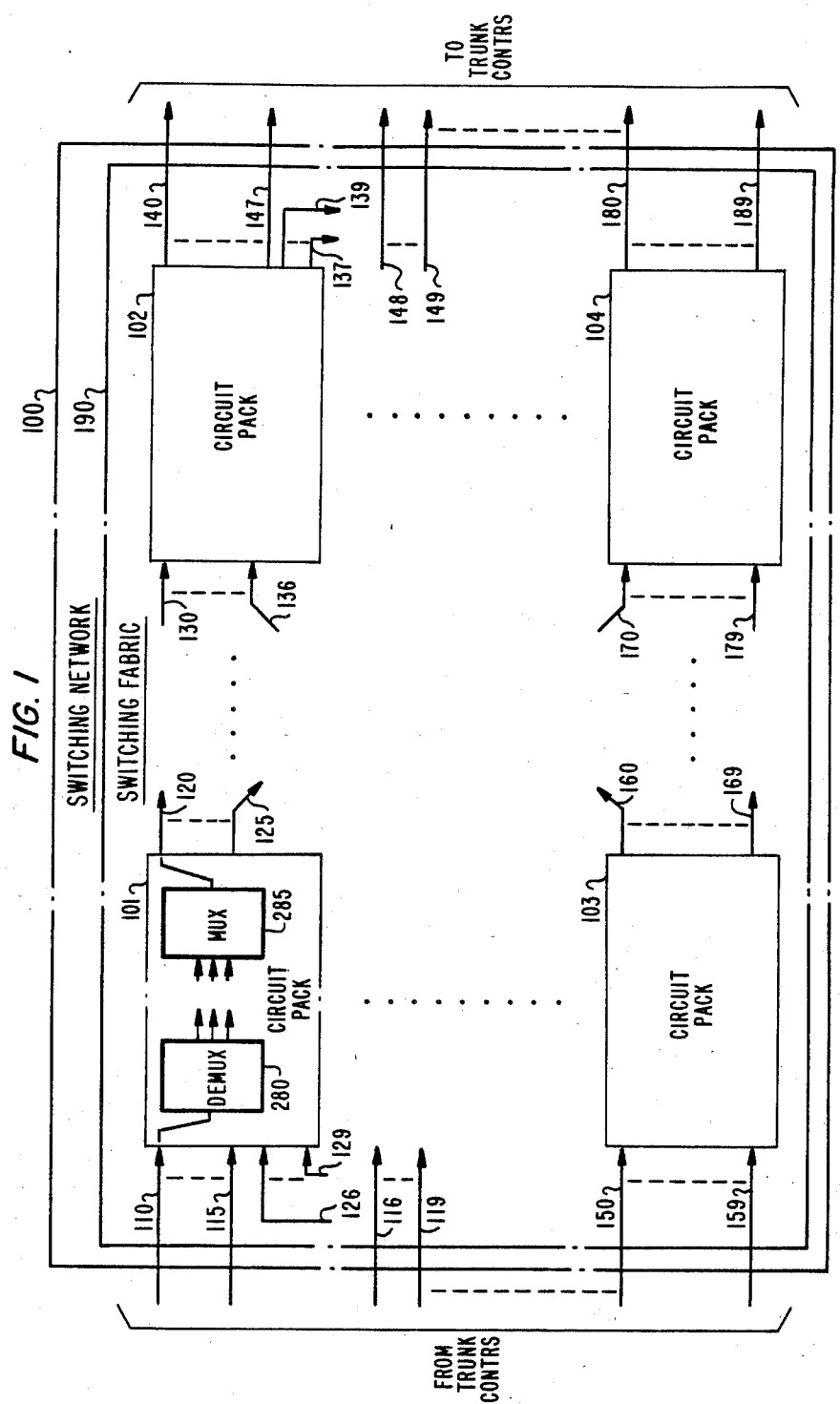
FIG. 1 is a schematic block diagram of the structure of an illustrative switching network including circuit packs embodying the invention.

Turning now to the drawing, FIG. 1 is a representation of a packet switching network 100 of the type that may be used to configure a packet switching system. In such a system (not shown), trunk controllers interface the network 100 to trunks for communication with other networks and with host devices. The network 100 is illustratively shown as connected to trunk controllers (not shown) by links 110-119, 150-159, 140-149, and 180-189. The actual number of links connecting to a network 100 varies with the size of the network 100 and the number of subtending trunk controllers. While signals may be transmitted over a link in either direction, for purposes of packet transmission the links are unidirectional, in that signal streams that make up packets are transmitted over the links in one direction only. Hence, the network 100 receives packets on incoming links 110-119 and 150-159 and transmits packets on outgoing links 140-149 and 180-189.

The switching fabric 190 of the network 100 is a matrix of interconnected switching nodes. The matrix is physically distributed over at least one circuit pack. FIG. 1 illustratively shows four circuit packs 101-104, and suggests that the network 100 includes other circuit packs as well. The incoming and outgoing links 110-119, 150-159, 140-149 and 180-189 connect to input and output contacts on various ones of the circuit packs. In the illustrative example of FIG. 1, the links 110-115 are shown connected to the circuit pack 101, the links 140-147 are shown connected to the pack 102, the links 150-159 are shown connected to the pack 103, and the links 180-189 are shown connected to the pack 104. The links 116-119 and 148-149 are connected to other packs (not shown) of the network 100.

The circuit packs of the network 100 are likewise interconnected with each other by links. FIG. 1 shows links 120-129 connecting the pack 101 to other packs, links 130-139 connecting the pack 102 to other packs, links 160-169 connecting the pack 103 to other packs, and links 170-179 connecting the pack 103 to other packs. The actual number of links connecting to a circuit pack varies with the number, type, and configuration of switching nodes residing on that pack.

Figure 4:
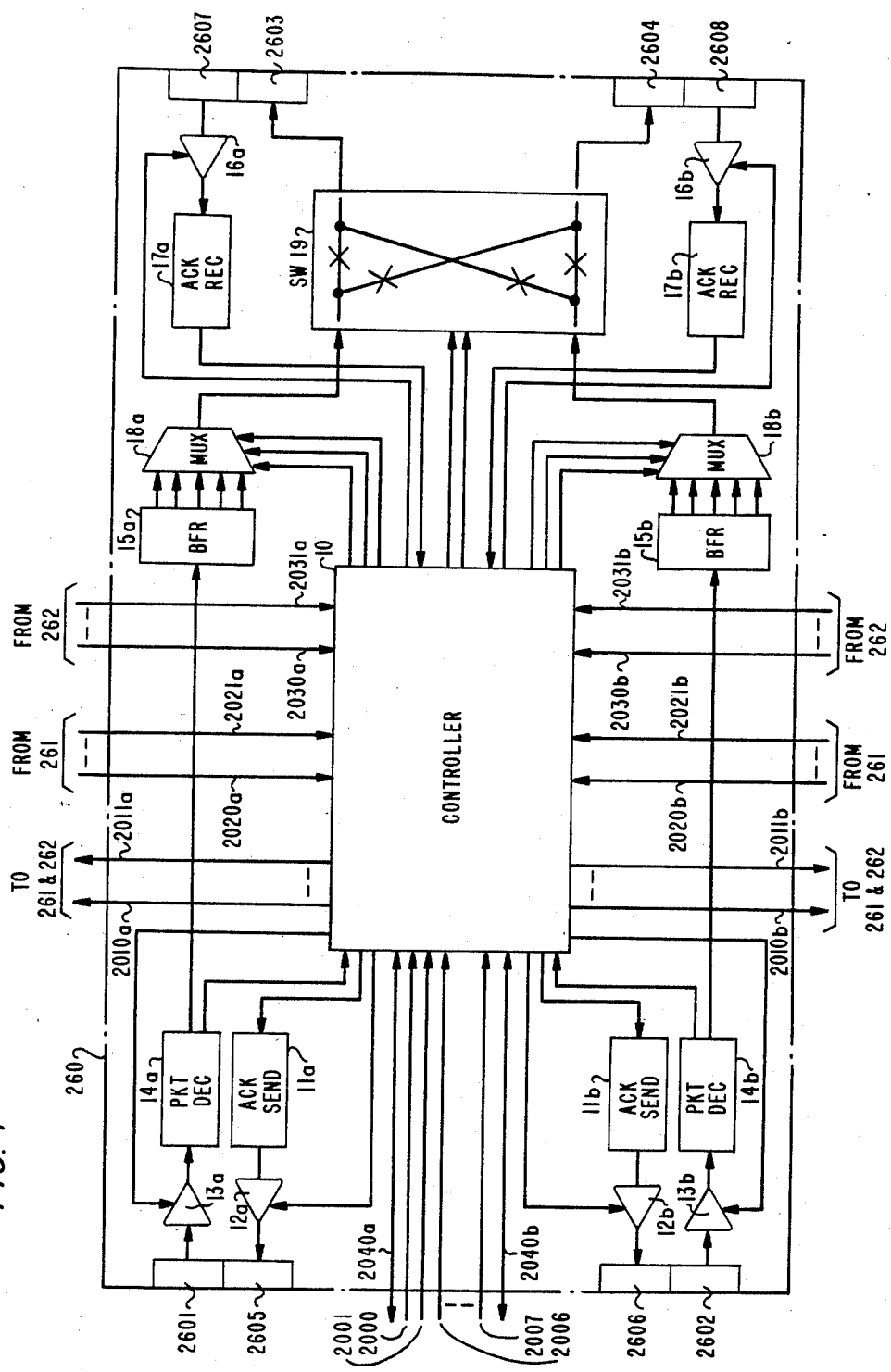
FIG. 4 is a block diagram of an illustrative packet switching node of FIGS. 2a-c and 3a-c.

An illustrative node 260 such as may be used to configure the network 100 is diagramed in block form in FIG. 4. The node 260 is substantially conventional. The node 260 is a packet switch. It has two input ports 2601 and 2602 for receiving packets. The node 260 is capable of buffering one packet received at each packet input port. The node 260 also has two output ports 2603 and 2604 for transmitting packets. The packets received at any packet input port are transmittable to any of the two packet output ports. After receipt of a packet on a packet input port, the address contained in that packet is used to determine to which packet output port the packet should be retransmitted.

The node 260 further has two output ports 2605 and 2606 for transmitting acknowledgment signals, and two input ports 2607 and 2608 for receiving acknowledgment signals. The acknowledgment ports 2605-2608 are associated with the packet ports 2601-2604, respectively. The node 260 transmits an acknowledgment signal on an acknowledgment signal output port to acknowledge receipt of a packet, if any, on the associated packet input port and to signal readiness to receive the next packet on that packet input port. In turn, the node 260 does not transmit a packet on a packet output port until it receives an acknowledgment signal on the associated acknowledgment signal input port.

The operation of the node 260 is directed by a controller 10. The controller 10 is a finite state machine. Such devices are well known in the art. The controller 10 causes an acknowledgment signal to be transmitted at the acknowledgment signal output port 2605, by activating an acknowledgment sender 11a and enabling a gated line driver 12a. The sender 11a generates the acknowledgment signal. It is, for example, a register which contains the acknowledgment signal code. It shifts out the code upon command from the controller 10. The output of the sender 11a is connected through the gated line driver 12a to the port 2605. When enabled, the driver 12a passes the acknowledgment signal to the port 2605.

Following transmission of the acknowledgment signal at the port 2605, the controller 10 deactivates the sender 11a and disables the driver 12a. The controller 10 then gets-ready to receive a packet at the port 2601, by enabling a gated line driver 13a which connects the port 2601 to the input of a packet decoder 14a.

The packet decoder 14a has one-output connected to a buffer 15a which is used to temporarily store a received packet and another output connected to the controller 10. The decoder 14a distinguishes the various fields that make up a packet. Upon receipt of a packet, the decoder 14a sends the control fields of the packet, including the address field designating the destination of the packet and the length field designating the length of the packet, to the controller 10. The decoder 14a also sends the received packet to the buffer 15a for storage.

The controller 10 uses the address field to decide which of the packet output ports 2603 and 2604 to send the received packet to, and uses the length field to check that the whole packet has been properly received. Following receipt of the packet, the controller 10 disables the driver 13a to disconnect the decoder 14a from the port 2601.

Assuming that the received packet is to be transmitted at the port 2603, the controller 10 checks whether it has received an acknowledgment signal at the associated port 2607. For this purpose the port 2607 is connected through a gated line driver 16a to the input of an acknowledgment receiver 17a. When not-transmitting a packet at the port 2603, the controller 10 enables the driver 16a to enable acknowledgment signals to reach the receiver 17a. The receiver 17a compares signals received at the port 2607 with an expected acknowledgment signal. When these match, the receiver 17a notifies the controller 10 over a signal line that an acknowledgment has been received.

If an acknowledgment signal has not been received at the port 2607, the controller 10 waits for it. When the acknowledgment signal is received, the controller 10 disables the driver 16a to disconnect the acknowledgment receiver 17a from the port 2607. The controller 10 then directs a multiplexer 18a to extract the stored packet from the buffer 15a and send it to a switch 19.

The buffer 15a has a plurality of outputs spaced along its length and coupled to the multiplexer 18a, which allow the contents of the buffer 15a to be extracted without the necessity of shifting the contents through the whole length of the buffer. Based on the length of the packet stored in the buffer 15a, the controller 10 specifies to the multiplexer 18a from which buffer output to extract the buffer contents.

The switch 19 selectively couples the outputs of the multiplexer 18a and of another multiplexer 18b to the ports 2603 and 2604. The controller 10 directs the switch 19 to select the output of the multiplexer 18a for connection to the port 2603.

Following transmittal of the packet at the port 2603, the controller 10 turns off the multiplexer 18a, reactivates the driver 16a to allow acknowledgment signals to reach the acknowledgment receiver 17a from the port 2607, and activates the acknowledgment sender 11a and driver 12a to cause an acknowledgment signal to be transmitted at the port 2605.

The discussion of the structure and operation node 260 has so far concerned the structure and operation thereof with respect to the ports 2601, 2605, 2603 and 2607. The node's structure with respect to the ports 2602, 2606, 2604, and 2608 is a mirror image of that just discussed and comprises the elements 12b-18b which are like the elements 12a-18a. The controller 10 controls the operation of the elements 12b-18b in the same manner as was just discussed. The switch 1-9 selectively couples the output of the multiplexer 18b to the ports 2603 and 2604.

Figure 2A:
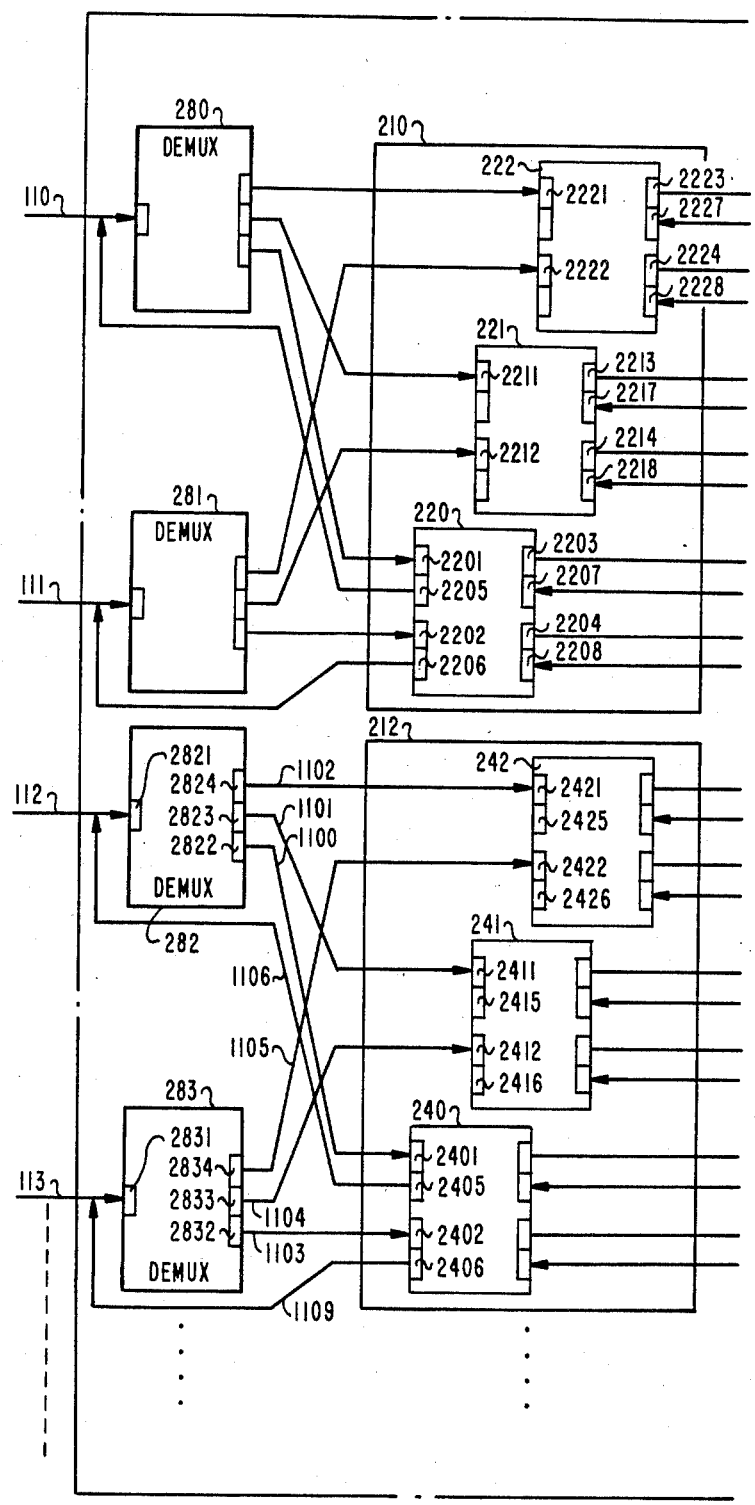
FIGS. 2a-c are a first example of an illustrative circuit pack of FIG. 1 embodying a first aspect of the invention.
Figure 2B:
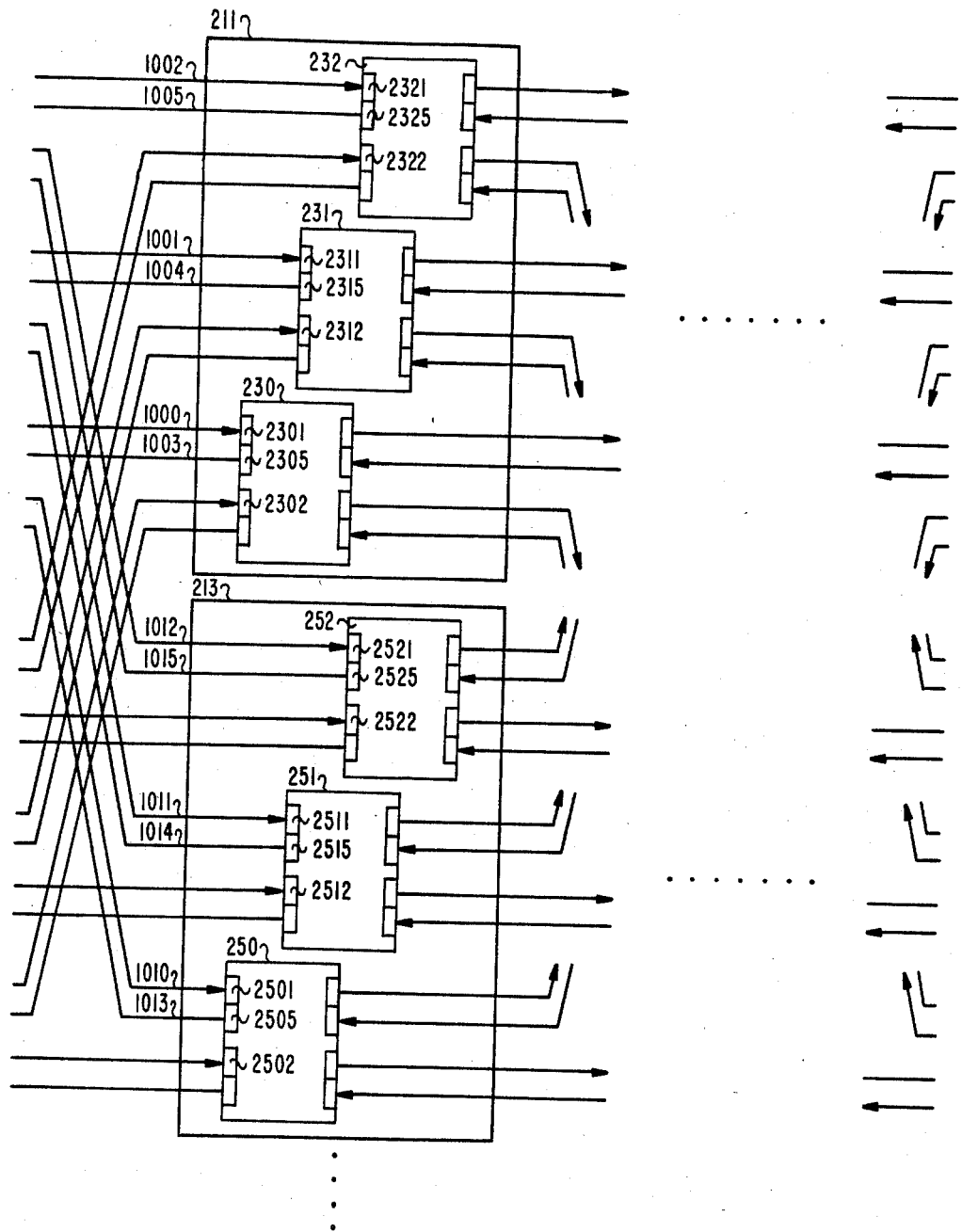
Figure 2C:
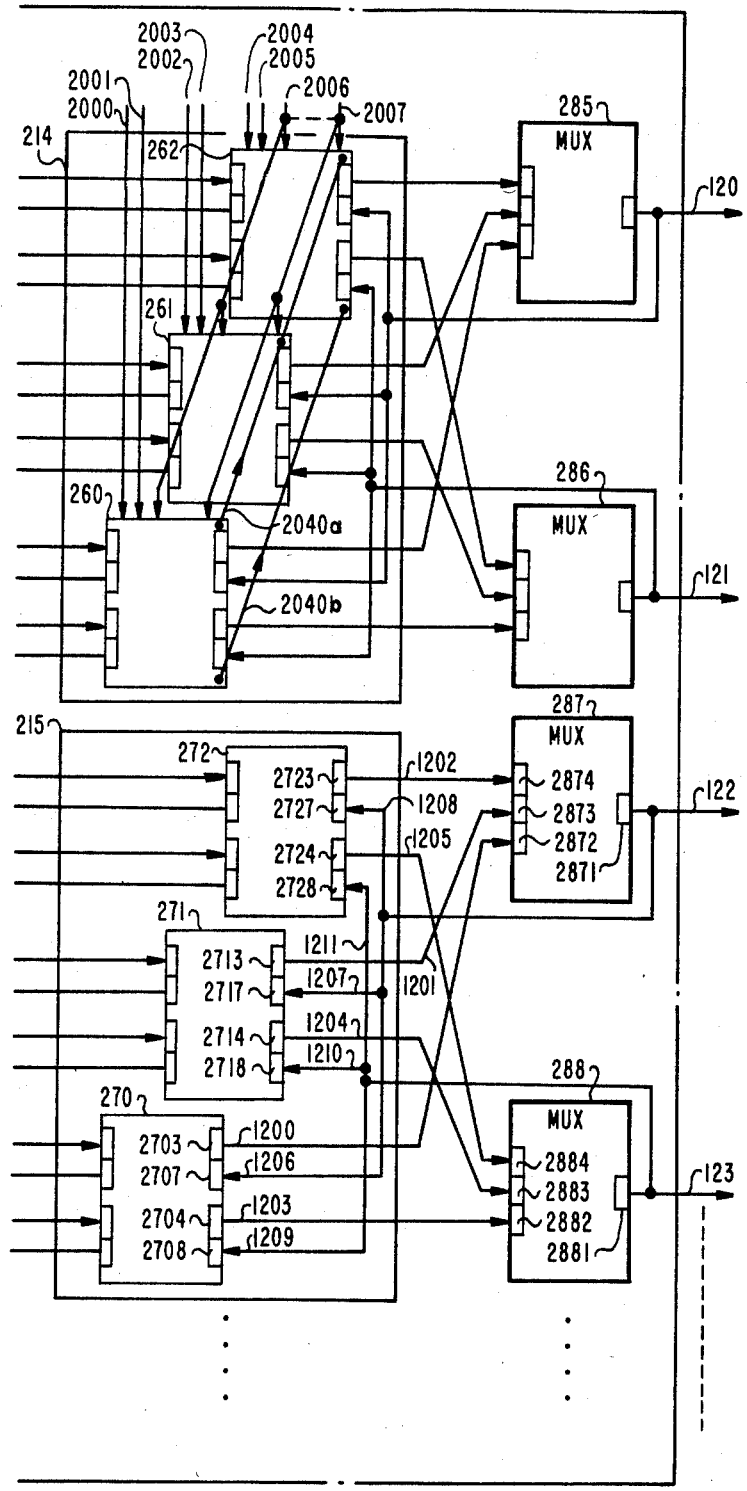

Other aspects of the node 260 are discussed in conjunction with the discussion of FIGS. 2a-c.

According to one aspect of the invention, the effective rate at which switching nodes can process, i.e., switch, a packet, is increased without changing the technology of the nodes and without increasing the number of inter-pack links in the network 100, and hence without increasing the number of link contacts needed on the circuit packs. According to this aspect of the invention, the circuit packs of the network 100 are illustratively configured as shown in FIGS. 2a-c. FIGS. 2a-c are the schematic of the circuit pack 101, which is taken to be representative of all of the circuit packs of the switching fabric 190 of the network 100.

As shown in FIGS. 2a-c, the circuit pack 101 includes a plurality of switching nodes that are interconnected in a regular manner to form a matrix of switching nodes. FIGS. 2a-c illustratively show the node pack 101 as containing nodes 220-222, 230-232, 240-242, 250-252, 260-262, and 270-272, and graphically suggests that the pack 101 contains other nodes as well. Physically, the circuit pack 101 is commonly a circuit board on which are mounted the components that make up the switching nodes and other circuitry. Hence, the number of nodes contained by a pack is limited by the size of the pack's circuit board, which size limits not only the number of nodes that can be placed on the pack but also the number of external connections, i.e., the number of input and output signal contact pins such as those required for connecting links thereto, that can be made on the pack.

The nodes of the pack 101 are functionally divided into a plurality of sets of nodes, wherein each set illustratively contains three nodes. FIGS. 2a-c show set 210 containing the nodes 220-222, set 211 containing the nodes 230-232, set 212 containing the nodes 240-242, set 213 containing the nodes 250-252, set 214 containing the nodes 260-262, and set 215 containing the nodes 270-272. The nodes of each set operate in parallel, and together they perform the functions in relation to a packet that are commonly performed by a single node in conventional packet switching networks. This is explained further below.

Because they operate in parallel, effectively as a single node, the nodes of each set of nodes are connected in parallel to the nodes of another set of nodes. Interconnection of the nodes is accomplished by means of lines, i.e., conductors, each of which extends between an output of a node of one set of nodes and an input of a node of another set of nodes. Thus, in FIGS. 2a-c, packet signal outputs 2203, 2213, and 2223 of the nodes 220, 221 and 222, respectively, of the node set 210, are shown connected by lines 1000, 1001, and 1002, respectively, to the packet signal inputs 2301, 2311, and 2321, respectively, of the nodes 230, 231, and 232, respectively, of the node set 211. Likewise, the acknowledgment outputs 2305, 2315, and 2325 of the nodes 230, 231, and 232, respectively, are shown connected by lines 1003, 1004, and 1005, respectively, to the acknowledgment inputs 2207, 2217, and 2227, respectively, of the nodes 220, 221, and 222, respectively. Similarly, the other packet signal outputs 2204, 2214, and 2224 of the nodes 220, 221, and 222, respectively, of the set 210, are shown connected by lines 1010, 1011, and 1012, respectively, to the packet signal inputs 2501, 2511, and 2521, respectively, of the nodes 250, 251, and 252, respectively, of the set 213. And likewise, the acknowledgment outputs 2505, 2515, and 2525 of the nodes 250, 251, and 252, respectively, are shown connected by lines 1013, 1014, and 1015, respectively, to the acknowledgment inputs 2208, 2218, and 2228, respectively, of the nodes 220, 221, and 222, respectively. The nodes of the sets 211 and 213 have their other inputs and outputs similarly connected to nodes of other sets, and the other sets of nodes are similarly interconnected.

Nodes of a circuit pack which are connected either to nodes residing on another circuit pack or to trunk controllers have packet signal inputs or outputs coupled to the links that provide the connection. The coupling is accomplished via multiplexers and demultiplexers, each of which allows certain outputs and inputs, respectively, of a set of nodes to be coupled to a single link. As shown in FIGS. 2a-c, each set of nodes that is coupled to a link has a pair of multiplexers or demultiplexers associated therewith. The multiplexers and demultiplexers are also included in the circuit pack.

Each incoming link is connected to the input port of a demultiplexer. Output ports of each demultiplexer are each connected by a line to a packet signal input of one node of a set of nodes. Hence each demultiplexer may be thought of as serving a set of inputs of a set of nodes. Similarly, input ports of a multiplexer are each connected by a line to a packet signal output of a node of one set of nodes. Thus each multiplexer serves a set of outputs of a set of nodes. The output port of a multiplexer is connected to an outgoing link.

Referring to the example of FIGS. 2a-c, a pair of demultiplexers 282 and 283 is shown associated with the set of nodes 212. The input port 2821 of the demultiplexer 282 is connected to the link 112, and the input port 2831 of the demultiplexer 283 is connected to the link 113. The three output ports 2822, 2823, and 2824 of the demultiplexer 282 are connected by lines 1100, 1101, and 1102, respectively, to the set of packet signal inputs 2401, 2411, and 2421, respectively, of the nodes 240, 241, and 242, respectively. And the three output ports 2832, 2833, and 2834 of the demultiplexer 283 are connected by lines 1103, 1104, and 1105, respectively, to the set of packet signal inputs 2402, 2412, and 2422, respectively, of the nodes 240, 241, and 242, respectively.

Only one node of a set of nodes that are coupled to an incoming link generally has an acknowledgment output connected to that link. The acknowledgment outputs of the other nodes of the set are generally left unconnected. The connection of acknowledgment outputs to links is direct, in that it bypasses the demultiplexers. Referring again to the example of FIGS. 2a-c, the acknowledgment outputs 2405 and 2406 of the node 240 of the set 212 are connected by lines 1106 and 1109, respectively, to the links 112 and 113, respectively.

Alternatively, an acknowledgment output of each node of a set may be coupled to the associated link through a mechanism, such as a latched input AND gate, that generates an acknowledgment signal on the link only when it detects that all the nodes of a set have generated acknowledgment signals.

FIGS. 2a-c also show the demultiplexers 280 and 281 as coupling the nodes of the set 210 to the incoming links 110 and 111, respectively. The links 110 and 111, the demultiplexers 280 and 281, and the nodes 220, 221, and 222 are indicated as connected in a manner equivalent to that just described for the links 112 and 113, the demultiplexers 282 and 283, and the node set 212. Other incoming links are likewise interfaced by associated demultiplexers to node sets.

Considering now the multiplexers shown in FIGS. 2a-c, a pair of multiplexers 287 and 288 is shown associated with the set of nodes 215. The output port 2871 of the multiplexer 287 is connected to the outgoing link 122, and the output port 2881 of the multiplexer 288 is connected to the outgoing link 123. The three input ports 2872, 2873, and 2874 of the multiplexer 287 are connected by lines 1200, 1201, and 1202, respectively, to the set of packet signal outputs 2703, 2713, and 2723, respectively, of the nodes 270, 271, and 272, respectively. And the three input ports 2882, 2883, and 2884 of the multiplexer 288 are connected by lines 1203, 1204, and 1205, respectively, to the set of packet signal outputs 2704, 2714, and 2724, respectively, of the nodes 270, 271, and 272, respectively.

All nodes of a set of nodes that are coupled to an outgoing link generally have acknowledgment inputs connected to that link. The acknowledgment inputs connect directly to the link, in that their connection bypasses the multiplexer. Referring again to the example of FIGS. 2a-c, the acknowledgment inputs 2707, 2717, and 2727 of the nodes 270, 271, and 272, respectively, are connected by lines 1206, 1207, and 1208, respectively, to the link 122. And the acknowledgment inputs 2708, 2718, and 2728 of the nodes 270, 271, and 272, respectively, are connected by lines 1209, 1210, and 1211, respectively, to the link 123.

FIGS. 2a-c also show the multiplexers 285 and 286 as coupling the nodes of the set 214 to the outgoing links 120 and 121, respectively. The links 120 and 121, the multiplexers 285 and 286, and the nodes 260, 261, and 262 are indicated as connected in a manner equivalent to that just described for the links 122 and 123, the multiplexers 287 and 288, and the node set 215. Other outgoing links are likewise interfaced by associated multiplexers to node sets.

Figure 5:
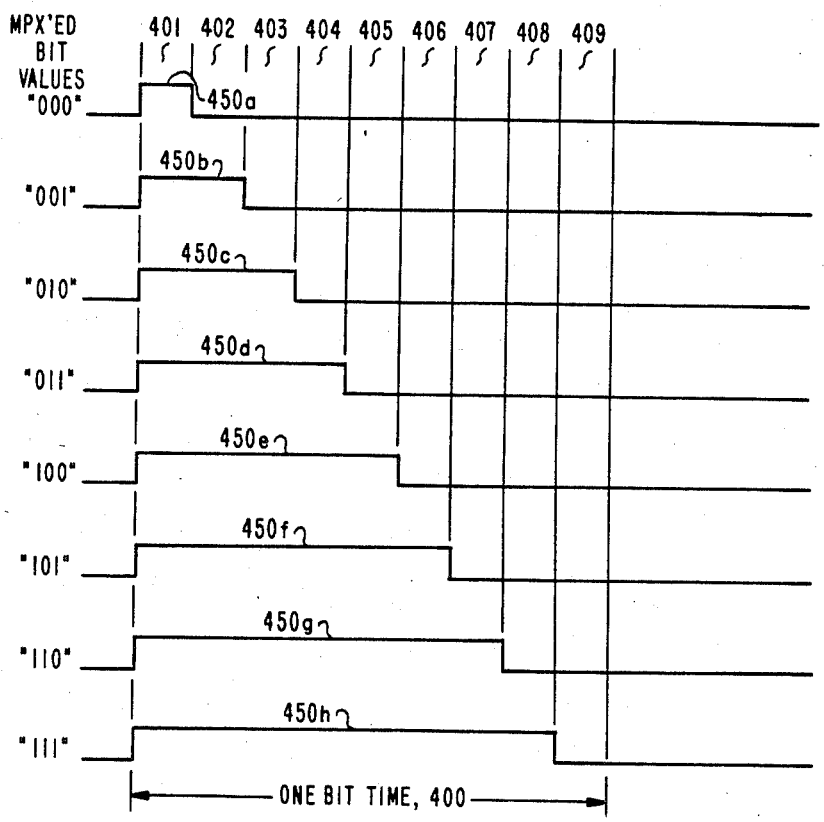
FIG. 5 is a timing diagram of multiplexed signals that travel over links of FIGS. 2a-c and 3a-c.

Packet signals transversing the links of the network 100 are multiplexed. In the illustrative example of this application, a multiplexed pulse-width modulation scheme is used to multiplex signals on the links. This multiplexing scheme is diagramed in FIG. 5. As FIG. 5 shows, three bits are multiplexed into each multiplexed pulse-width modulated signal 450. The value of the three bits is determined by the width of the pulse signals 450a-h. A certain period of time, referred to as one bit time 400, is assigned to each multiplexed pulse-width modulated signal 450. The bit time 400 is divided into nine time slots 401-409. The first eight time slots 401-408 are of equal duration. The remaining time slot 409 is at least as long in duration as a time slot of the first eight time slots 401-408.

For the first time slot 401 of a bit time 400, the link is always asserted, or placed in the logical "1" state, by the generator of the multiplexed pulse-width modulated signals, to indicate the beginning of the bit time 400. The first time slot 401 serves the purpose of a timing signal, to indicate to the recipient of the signal that a bit time 400 has commenced. The following seven time slots 402-408 carry the value of three packet bits, which value is represented by the number of slots 402-408 for which the link is asserted. Together, the time slots 401-408 uniquely represent the eight possible binary values of three bits. As FIG. 5 illustrates, when the link is not asserted during any of the time slots 402-408, the value of the three bits that is represented thereby is "000". When the link remains asserted during the time slot 402, the packet bit values are "001"; when the link remains asserted during the time slots 402 and 403, the packet bit values are "010"; and so on. Finally, when the link remains asserted during all of the time slots 402-408, the packet bit values are "111". The link is always deasserted by the generator of the multiplexed pulse-width signals during the ninth time slot 409, to signal the end of the bit time 400 and thus to detectably separate the end of one bit time from the start of the next bit time. The ninth time slot 409 ends upon reassertion of the link at the star of the subsequent bit time.

Since each pulse-width modulated signal 450 carries the value of three bits, the values of three bits are transferred in parallel by a link, and the bit transfer rate of the links of the network 100 is three times the signaling frequency.

In the example of FIGS. 2a-c, the three bits that generally are multiplexed into a single multiplexed pulse-width modulated signal 450 are three consecutive bits of a single packet. The signal stream of multiplexed bits is received at a circuit pack by a demultiplexer which demultiplexes each multiplexed signal into the three constituent bit value signals and outputs the constituent signals at its output ports. The demultiplexer thus generates at its output ports three parallel signal substreams which together represent the bits of a packet. Each of the three substreams is conducted by a line to the packet signal input of a different one of the three nodes of a node set. The nodes of a node set switch the three substreams in parallel, each node switching the substream to one of its two outputs. Each node operates in a substantially conventional manner.

Turning to the particulars of the example of FIGS. 2a–c, the multiplexed signal stream carried by the link 112 is received by the demultiplexer 282 at its input port 2821. The demultiplexer 282 separates the multiplexed signal stream into three parallel substreams of unmultiplexed serial signals. The demultiplexer 282 generates the three substreams at its output ports 2822, 2823, and 2824, from whence they are conducted by the lines 1100, 1101, and 1102, respectively, to the inputs 2401, 2411, and 2421, respectively, of the nodes 240, 241, and 242, respectively.

Path selection, i.e., determination of which of its two outputs to switch a packet to, is done by nodes on the basis of address bits that are included in each packet. In the circuit configuration of FIGS. 2a–c, all nodes of a node set use the same address bit for path selection. When nodes are arranged in the configuration of FIGS. 2a–c, it is therefore necessary to ensure that each node in the network 100 receives the information required by it for path selection.

A number of ways of accomplishing this result are possible. One way is to triplicate the address bits and interleave them in the multiplexed signal stream such that each node receives the full address in its input signal substream. Thus, for the address portion of the packet, each multiplexed signal carries in triplicate the value of a single address bit. As a consequence, upon demultiplexing of the multiplexed address signals, the value of each address bit is included in each signal substream, and hence each node of a set of nodes receives the full packet address.

A second way of ensuring that each node receives information required for path selection is to adapt the nodes of each node set to accept a path selection command, i.e., the requisite address bit value, from a "master" node. For each node set, a master node is one of the nodes of the set. The master node is defined by its location in the node set and in the node matrix. The node matrix may be thought of as divided into a plurality of stages, or columns. The sets of nodes of a network 100 that are the first to switch packets after they have been received by the network 100 form the first stage; the sets of nodes that receive packets from nodes of the first stage and are the second to switch packets form the second stage; and so on. Illustratively, the node sets 210 and 212 in FIGS. 2a–c are included in one stage of the network, which is for example the first stage, while the node sets 211 and 213 are included in the next stage of the network, which is for example the second stage. Likewise, the node sets 214 and 215 lie in one stage of the network, for example the fourth stage.

Each node has a plurality of network and set address lines connected thereto, which lines indicate to the node the stage of the network that it resides in and the number of that node within the set of nodes, respectively.

This is graphically illustrated in FIG. 2c, where the nodes of the node set 214 are shown connected to network and set address lines. The node 260 is connected to set address lines 2000 and 2001, which indicate to the node 260 that it is the first node in the set 214. As FIG. 4 shows, the lines 2000 and 2001 connect to the controller 10. Similarly, address lines 2002 and 2003 connect to the node 261 and indicate to the node 261 that it is the second node of the set, and address lines 2004 and 2005 connect to the node 262 and indicate to the node 262 that it is the third node of the set. The first nodes of all node sets are connected to the lines 2000 and 2001; the second nodes of all node sets are connected to the lines 2002 and 2003; and the third nodes of all node sets are connected to the lines 2004 and 2005. Further as shown in FIG. 2c, all three nodes of the set 214 are connected to network address lines 2006–2007, which indicate to the nodes which stage of the network they are in, for example the fourth stage. As shown in FIG. 4, the lines 2006–2007 connect to the controller 10. All nodes of node sets in the fourth stage are likewise connected to the lines 2006–2007. Thus each node of the network 101 has precise information on its position within the node matrix and within its node set.

Upon demultiplexing of the packet signal stream at the demultiplexers, the first signal substream includes the first, fourth, seventh, etc., bits of the packet address. Similarly, the second signal substream includes the second, fifth, eighth, etc. address bits, and the third signal substream includes the third, sixth, ninth, etc. address bits. Nodes of the first stage of the node matrix perform path selection on the basis of the first address bit of the packet and hence the first node of each node set in the first stage is the master node. Thus in the assumed example of FIGS. 2a–c, the nodes 220 and 240 are master nodes. Nodes of the second stage perform path selection on the basis of the second address bit and hence the second node of each node set in the second stage is the master node. Thus the nodes 231 and 251 are master nodes. And nodes of the third stage perform path selection on the basis of the third address bit and hence the third node of each node set in the third stage is the master node. Nodes of the fourth stage perform path selection on the basis of the fourth address bit and hence the first node of each set in the fourth stage is the master node. Thus in the assumed example of FIGS. 2a–c, the nodes 260 and 270 are master nodes.

The nodes of each node set are interconnected by a pair of common address lines, on which the master node outputs the value of the relevant address bits, one for packets being received at each of its two packet input ports, to provide this information to the other nodes of the set. As indicated in FIGS. 2c and 4, the nodes 260, 261, and 262 of the node set 214 are connected by common address lines 2040a and 2040b on which the node 260 transmits the relevant packet address bit values for packets received at the ports 2601 and 2602, respectively, which values the nodes 261 and 262 receive over the lines 2040a and 2040b. As FIG. 4 shows, the lines 2040a and b connect to the controller 10.

Just as each node of a node set in the configuration of FIGS. 2a–c receives only certain bits of a packet address field, similarly each node in such a node set receives only certain bits of a packet length field. It is therefore necessary to provide a means by which each node of a set is enabled to receive the complete packet length information.

Again, a number of ways of accomplishing this result are possible. One way is to rearrange the bits of the packet length field in a packet such that each node of a set receives a group of contiguous bits of the length field. For instance, for purposes of the example of FIGS. 2a-c, the length field bits are arranged such that one node of a set receives the bits representing the most significant one third of the length field, a second node of the set receives the bits representing the least significant one third of the length field, and the third node receives the remaining bits of the length field. The nodes of a set are then interconnected by signal lines over which each node of the set transmits to the other nodes of the set the bits of the length field that it received at its packet input ports, and receives from the other nodes of the set the length field bits that those nodes received at their input ports.

This configuration is illustrated in FIG. 4. As shown, the controller 10 of the node 260 is connected by signal lines 2010a-2011a, 2020a-2021a, 2030a-2031a, 2010b-2011b, 2020b-2021b, and 2030b-2031b, with the other two nodes 261-262 of the node set 214. The controller 10 transmits to the nodes 261 and 262 the packet length field bits that the node 260 receives at its ports 2601 and 2602 over the signal lines 2010a-2011a and 2010b-2011b, respectively. The controller 10 receives from the node 261 the packet length field bits that the node 261 receives at its two packet input ports over the signal lines 2020a-2021a and 2020b-2021b. And the controller 10 receives from the node 262 the packet length field bits that the node 262 receives at its two packet input ports over the signal lines 2030a-2031a and 2030b-2031b.

The above discussion on providing path selection and packet length information to nodes in the network 100 is not intended to be exhaustive. Other schemes for accomplishing this objective would occur to one skilled in the art.

When the nodes of a set have received all bits that make up a packet, have selected the path for the packet, and have switched the packet to that path, they generate acknowledgment signals to indicate to the node set of the preceding stage their readiness to receive the next packet. In the case of a node set that is coupled to input links, the acknowledgment signals generated by only one of the nodes of the set are returned over the links. For example, as shown in FIGS. 2a-c, only the acknowledgment signals generated by the node 220 at its acknowledgment outputs 2205 and 2206 are coupled to the links 110 and 111, respectively. Hence, in the example of FIGS. 2a-c, the acknowledgment signals generated by one node of a set serve as the acknowledgment signals on behalf of the whole set of nodes.

After they have been switched through the various node matrix stages that are contained in a circuit pack, the three signal substreams that represent a packet appear in parallel at the packet signal outputs of nodes of a node set that is connected to demultiplexers. Each of the three signal substreams is conducted by a connecting line from a node output to one of three input ports of a multiplexer. The multiplexer remultiplexes the three substreams into a composite, multiplexed, signal stream such as that which was discussed in conjunction with FIG. 5. The multiplexer thus generates at its output a multiplexed signal stream equivalent to that stream which initially brought the packet to the circuit pack. From the output of the multiplexer, the multiplexed signal stream is conducted by a link to the next circuit pack or to a trunk controller.

Referring again to the example of FIGS. 2a-c, three parallel signal substreams appearing at the outputs 2703, 2713, and 2723 of the nodes 270, 271, and 272, respectively, are conducted by the lines 1200, 1201, and 1202, respectively, to the input ports 2872, 2873, and 2874, respectively, of the multiplexer 287. The multiplexer 287 forms from the substreams a multiplexed signal stream which it generates at its output port 2871 for transmission on the link 122.

When the device to which the link 122 serves as an input link is ready to receive another packet over the link 122, it sends an acknowledgment signal over the link 122. This signal is conducted by the lines 1206, 1207, and 1208 to the acknowledgment inputs 2707, 2717, and 2727, respectively, of the nodes 270, 271, and 272, respectively, to inform those nodes that they are each free to generate another packet signal substream at their respective packet signal outputs 2703, 2713, and 2723.

Figure 6:
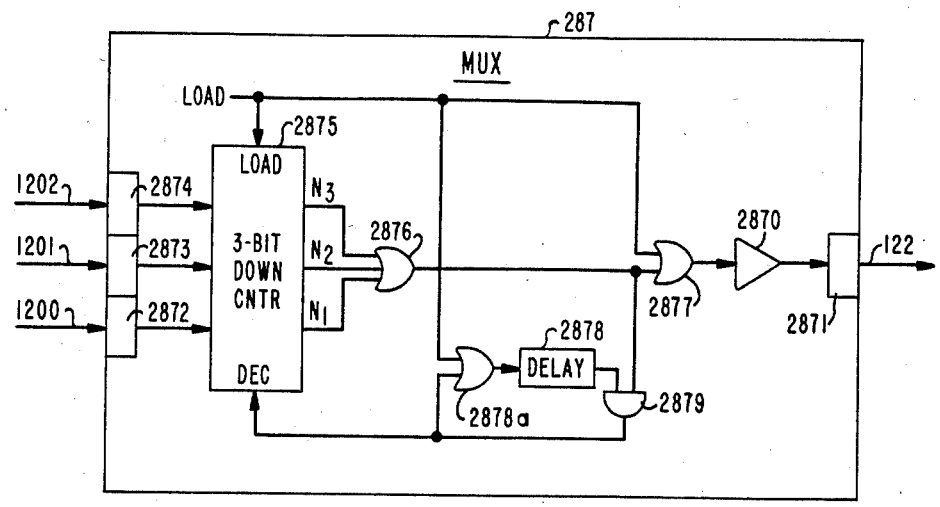
FIG. 6 is a circuit diagram of a multiplexer of FIGS. 2a-c and 3a-c.
Figure 7:
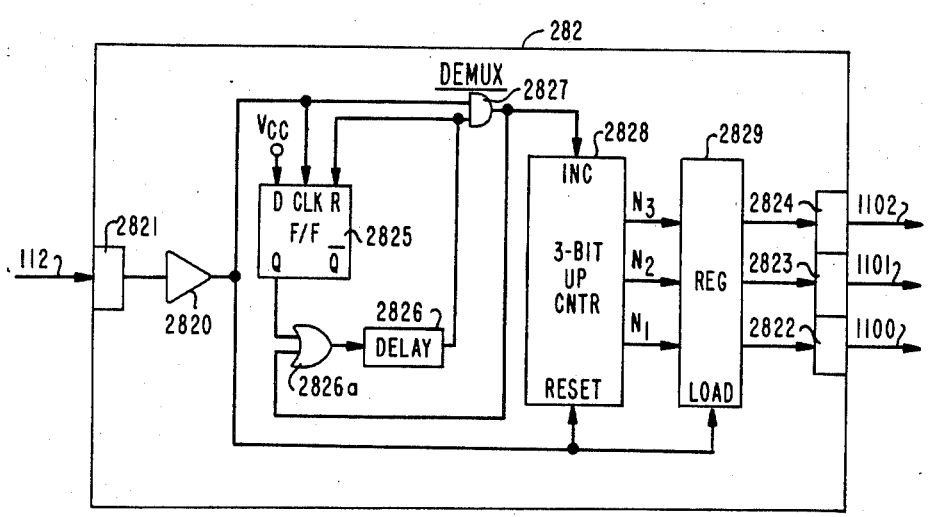
FIG. 7 is a circuit diagram of a demultiplexer of FIGS. 2a-c and 3a-c.

The above-mentioned multiplexers and demultiplexers may be constructed as shown in FIGS. 6 and 7, respectively. FIG. 6 is the circuit diagram of the multiplexer 287 of FIGS. 2a-c, which multiplexer is taken to be representative of all multiplexers of the network 100. As shown in FIG. 6, the input ports 2872, 2873, and 2874 of the multiplexer 287 form parallel inputs to a conventional 3-bit counter 2875. Three parallel outputs of the counter 2875 are connected to inputs of an OR gate 2876. The output of the OR gate 2876 forms one input to an OR gate 2877 and one input to an AND gate 2879. The output of the AND gate 2879 is connected to the DECREMENT (DEC) input of the counter 2875 and to one input of an OR gate 2878a, whose output connects to the input of a conventional delay circuit 2878. The output of the delay circuit 2878 forms a second input to the AND gate 2879. A second input of the OR gate 2878a is connected to a LOAD signal line. The LOAD signal line is also connected to a second input of the OR gate 2877, and to a LOAD input of the counter 2875. The output of the OR gate 2877 is connected through a conventional line driver 2870 to the output port 2871 of the multiplexer 287.

The start of a bit time period is signaled to the multiplexer 287 by a temporary assertion, i.e., pulsing of the LOAD signal line. The LOAD signal line may be pulsed in response to any suitable criterion. For example, the LOAD signal line may be pulsed in response to the appearance of an acknowledgment signal on the link 122. Or the LOAD signal line may be pulsed every bit time 400 (see FIG. 5) by a clock signal. Pulsing of the LOAD signal line causes the output of the OR gate 2877 to go high and hence results in assertion of the link 122 during the first time slot 401 of the bit time 400 (see FIG. 5). The LOAD pulse thus starts the pulse-width modulation by setting the output of the multiplexer 287 to the high state. The rising edge of the LOAD pulse also gates a bit of data from each of the input ports 2872-2874 into the counter 2875. The values of the three bits appear at the outputs of the counter 2875. If any one or more of the bits have a nonzero value, at least one of the outputs of the counter 2875 is nonzero, and hence the output of the OR gate 2876 is high. Otherwise, the output of the OR gate 2876 is low.

The LOAD pulse also causes a high signal level to be generated by the OR gate 2878a and appear at the input of the delay circuit 2878. This causes the delay circuit 2878 to output a pulse delayed from the LOAD pulse by the delay period of the circuit 2878. The delay period of the circuit 2878 is set to equal the duration of a time slot of the slots 401–409 of FIG. 5. If the output of the OR gate 2876 is nonzero, the delayed LOAD pulse propagates through the AND gate 2879 to the DECREMENT input of the counter 2875 and also to the input of the delay circuit 2878. Upon appearance of the falling edge of the delayed pulse at the DECREMENT input, the counter 2875 decrements its count, i.e., the bit values appearing at its outputs, by one.

The return of the delayed pulse to the input of the delay circuit 2878 through the OR gate 2878a causes the delay circuit 2878 to again regenerate this pulse at its output, following the delay. Thus a sequence of timing pulses is generated by the AND gate 2879 and the delay circuit 2878 for decrementing the counter 2875.

As long as the output of the counter 2875 is nonzero, the output of the gate 2876, and hence the output of the gate 2877 and of the multiplexer 287, remains high, and the counter 2875 continues to be decremented.

When the count of the counter 2875 reaches zero, the output of the OR gate 2876 goes low, sending low the output of the OR gate 2877 and hence sending low the output of the multiplexer 287. The low output of the OR gate 2876 also blocks the output of the delay circuit 2878 at the AND gate 2879, thereby ceasing the generation of timing signals for decrementing the counter 2875. The multiplexer 287 is thus restored to the idle state. The output of the multiplexer 287 remains low until it is sent high again by the arrival of the next LOAD pulse.

FIG. 7 is the circuit diagram of the demultiplexer 282 of FIGS. 2a–c, which demultiplexer is taken to be representative of all demultiplexers of the network 100. As shown in FIG. 7, the input port 2821 of the demultiplexer 282 is connected to the input of a conventional receiver and driver 2820. The output of the receiver and driver 2820 is connected to the CLOCK (CLK) input of a D-type flip-flop 2825, the RESET input of a conventional counter 2828, the LOAD input of a conventional register 2829, and an input of an AND gate 2827. The output of the AND gate 2827 is connected to the INCREMENT (INC) input of the counter 2828 and to an input of a OR gate 2826a whose output is connected to the input of a delay circuit 2826. A second input of the OR gate 2826a is formed by the Q output of the flip-flop 2825. The D input of the flip-flop 2825 is latched high. The output of the delay circuit 2826 is connected to a second input of the AND gate 2827 and to the RESET (R) input of the flip-flop 2825. The three parallel outputs of the counter 2828 form the inputs of the register 2829. The parallel outputs of the register 2829 connect to the output ports 2822–2824 of the demultiplexer 282.

The start of a bit time period is signaled to the demultiplexer 282 by the rising edge of a pulse incoming over the link 112 to the input port 2821. The rising edge of the incoming pulse resets the counter 2828 to zero and causes the flip-flop 2825 to assert high its Q output. This high output signal appears through the OR gate 2826a at the input of the delay circuit 2826 and causes the delay circuit 2826 to regenerate the signal at its output following the period of delay of the circuit 2826. The delay of the circuit 2826 is set for the same duration as the delay of the delay circuit 2878 of FIG. 6. The signal generated by the delay circuit 2826 resets the flip-flop 2825, causing the flip-flop 2825 to deassert its Q output. This low signal level propagates through the OR gate 2826a to the input of the delay circuit 2826 and causes the output of the delay circuit to become deasserted following the period of delay.

The output of the receiver 2820 remains high for as long as the signal received over the link 112 is high. If the output of the receiver 2820 is high when the output of the delay circuit 2826 is high, the output of the circuit 2826 is propagated through the AND gate 2827 to the INCREMENT input of the counter 2828 and through the OR gate 2826a to the input of the delay circuit 2826. Upon appearance of the falling edge of this signal at the INCREMENT input, the counter 2828 increments its count, i.e., the bit values appearing at its outputs, by one.

The return of the signal that was generated by the delay circuit 2826 to the input of the circuit 2826 causes the delay circuit 2826 to regenerate this signal at its output, following the delay. Thus a sequence of timing pulses is generated by the AND gate 2827 and the delay circuit 2826 for incrementing the counter 2828.

As long as the output the receiver 2820 is high, the count of the counter 2828 continues to be incremented, at a rate set by the delay of the delay circuit 2826. When the output of the receiver 2820 goes low, the AND gate 2827 becomes disabled, timing pulses to the counter 2828 cease being generated, and the counter stops incrementing. The falling edge of the output of the receiver 2820 loads the register 2829 with the count of the counter 2828. This count is latched by the register 2829. The latched count appears at the register's outputs and hence appears at the output ports 2882–2824 of the demultiplexer 282. The demultiplexer 282 is thus restored to the idle state. The outputs of the demultiplexer 282 remain at the value of the register 2829 until the contents of the register 2829 are changed by the completion of receipt by the receiver 2820 of the next multiplexed signal.

Figure 3A:
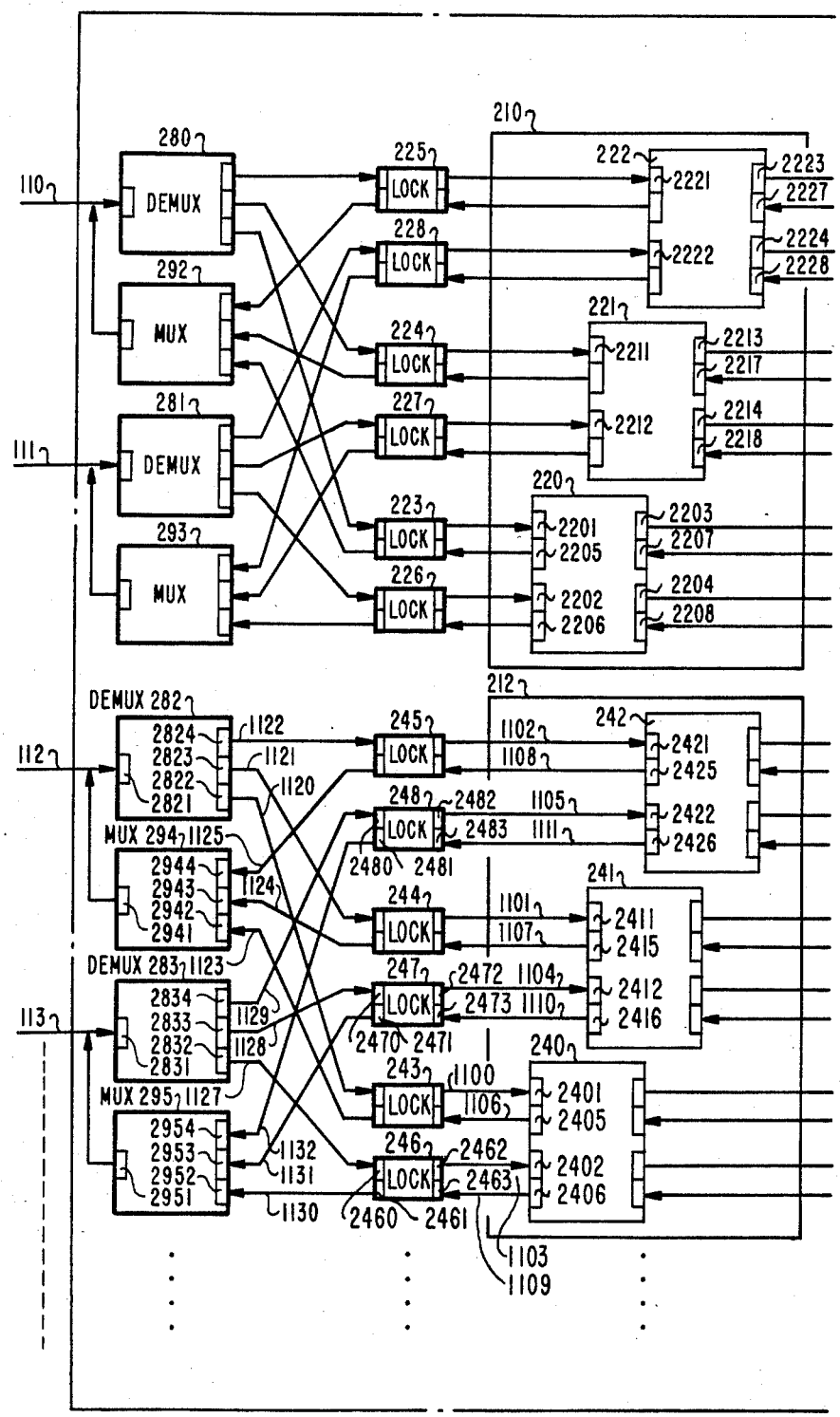
FIGS. 3a-c are a second example of an illustrative circuit pack of FIG. 1 embodying a second aspect of the invention.
Figure 3B:
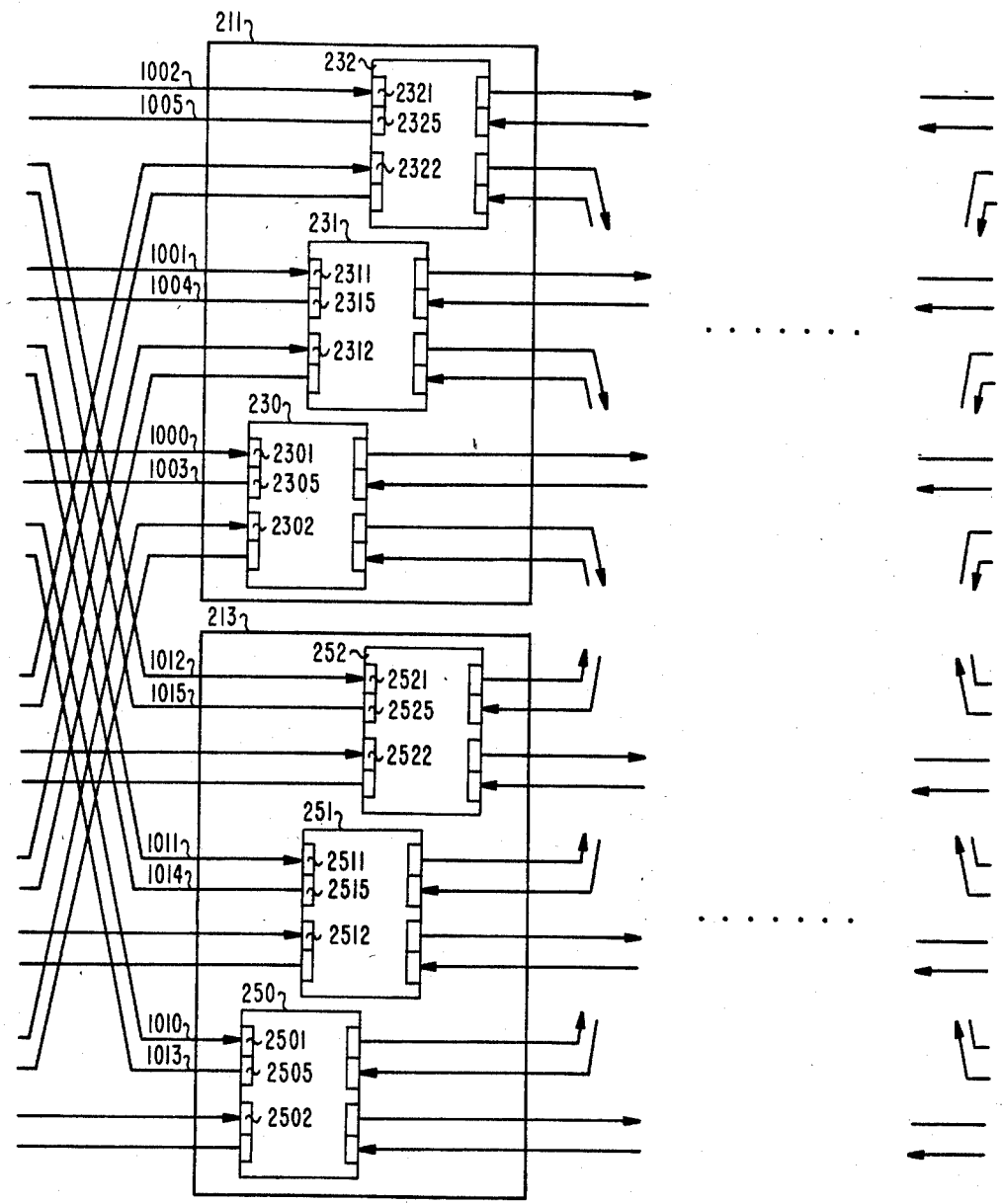
Figure 3C:
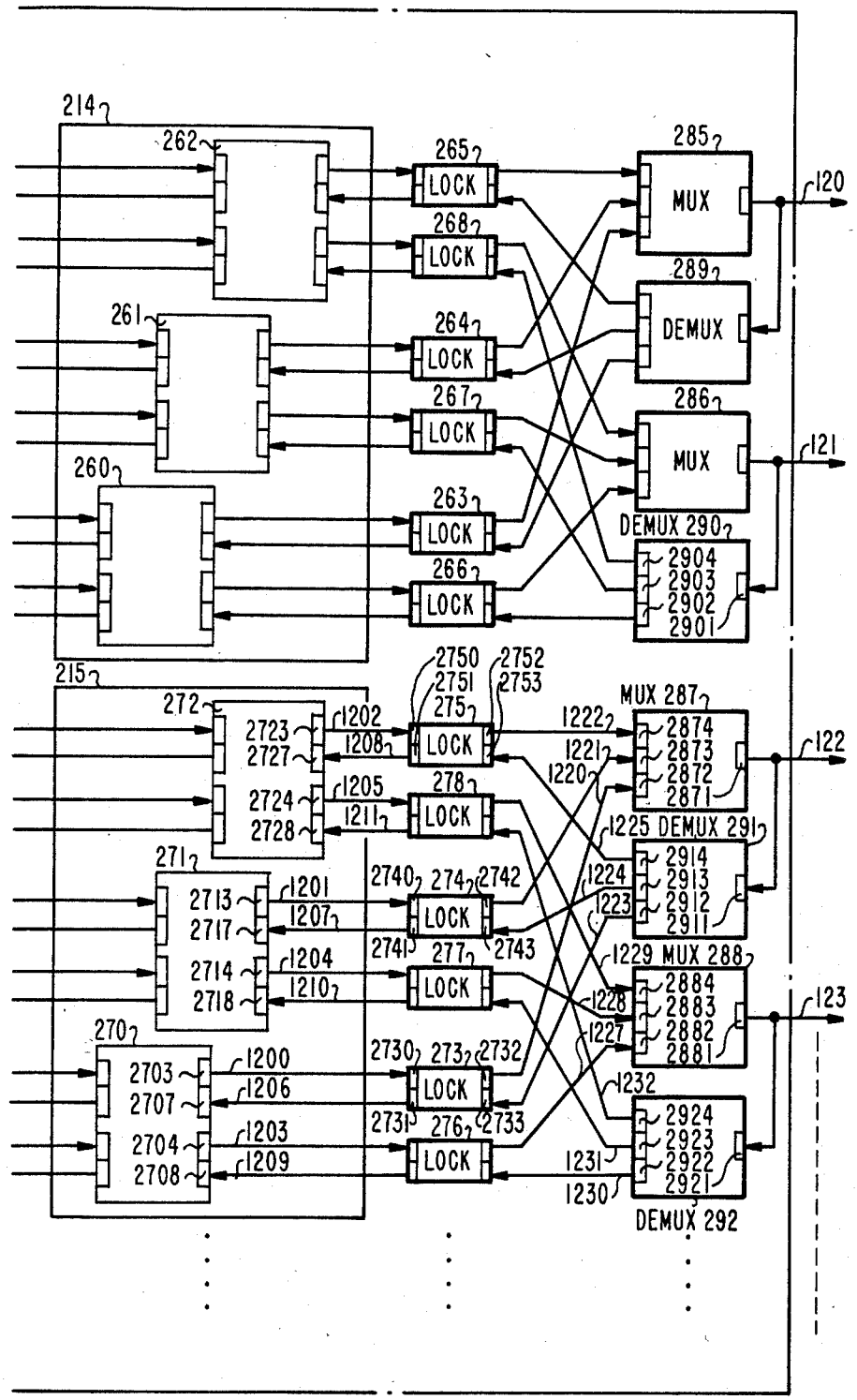

As an alternative to the configuration of the network 100 that is shown in FIGS. 2a–c, whereby the speed at which packets are switched through the network 100 is increased, it may be desirable to configure the network 100 to achieve other objectives. For example it may be desirable to increase the circuit density of circuit packs in such a way as to allow greater numbers of packets to be switched simultaneously on a circuit pack without the use of additional input or output contacts to the circuit pack. Or it may be desirable to decrease the number of input and output contacts to circuit packs without decreasing the circuit density of the packs. For such purposes, the circuit packs of the network 100 are illustratively configured as shown in FIGS. 3a–c. FIGS. 3a–c are the schematic of the circuit pack 101, which is taken to be representative of all of the circuit packs of the switching fabric 190 of the network 100. A comparison of FIGS. 2a–c and 3a–c reveals a significant commonality of structure and configuration between the two sets of figures. The same numerals are used in both sets of figures to designate equivalent structures. For the sake of brevity, only the differences between the FIGS. 2a–c and 3a–c are discussed here, with the understanding that in other respects the embodiment of FIGS. 3a–c is substantially like the embodiment of FIGS. 2a–c.

In the embodiment of FIGS. 3a–c, the nodes of a set of nodes no longer need operate in-parallel. The nodes of a node set are independent of each other, and each node alone processes, i.e., switches, all bits that form a whole packet. Therefore, the nodes of a node set may lie in different stages of the network 100. Nor do the nodes of one node set need be connected only to nodes of a second node set. Rather, the nodes of one node set may be connected to nodes belonging to different node sets. And a node of a set may even be connected to another node or nodes of the same set. It is only for ease of illustration that the sets of nodes of FIGS. 3a-c are shown interconnected in the same parallel manner as the node sets of FIGS. 2a-c.

Because the nodes of a node set of FIGS. 3a-c operate independently of each other and on different packets, they no longer have relevant information to convey to each other about the destination and length of packets. Rather, each node receives the complete information that it requires. Hence the nodes of a node set of FIGS. 3a-c are not interconnected by the lines 2040a and 2040b, 2010b-2011a, 2010b-2011b 2020a-2021a, 2020b-2021b, 2030a-2031a, and 2030b-2031b that were discussed in conjunction with FIGS. 2a-c. Furthermore, it is no longer acceptable to return on a link the acknowledgment of only one node of a set as the acknowledgment on behalf of all of the nodes of the set, as is done in the example of FIGS. 2a-c. Rather, the acknowledgments of all nodes of a set must be returned over a link. Furthermore, each node of a set can generate an acknowledgment at a different time, which for example may be the same time at which another node of the set is receiving packet bit values. Hence the forward and reverse transmissions over a link, corresponding to the use of the link for packet data transmissions and acknowledgment signal transmissions, respectively, must be synchronized with each other.

These objectives are achieved by interfacing node inputs and outputs to links in the manner illustrated in FIGS. 3a-c. In this example, a node is interfaced to a link by both multiplexers and demultiplexers. The node is coupled to the multiplexers and demultiplexers via locks. A packet input and the corresponding acknowledgment output of a node are connected to ports of an associated lock. Other two ports of the lock are connected to an output port of a demultiplexer and an input port of an associated multiplexer. The input port of the demultiplexer and the output port of the associated multiplexer are connected to the same link. Similarly, a packet output and the corresponding acknowledgment input of a node are connected to ports of an associated lock. Other two ports of the lock are connected to an input port of a multiplexer and an output port of an associated demultiplexer, whose respective output port and input port are connected to a common link.

In the example of FIGS. 3a-c, the demultiplexer 283 *and an associated multiplexer 295 are connected to the link 113. The link 113 connects to the input port 2831 of the demultiplexer 283 and to an output port 2951 of the multiplexer 295. Output ports 2832, 2833, and 2834 of the demultiplexer 283 are connected by lines 1127, 1128, 1129, respectively, to packet input ports 2460, 2470, and 2480, respectively, of locks 246, 247, and 248, respectively. Packet output ports 2462, 2472, and 2482, of the locks 246, 247, 248, respectively, are connected by lines 1103, 1104, and 1105, respectively, to the packet inputs 2402, 2412, and 2422, respectively, of the nodes 240, 241, and 242, respectively. Corresponding acknowledgment outputs 2406, 2416, and 2426, respectively, of the nodes 240, 241, and 242, respectively, are connected by lines 1109, 1110, and 1111, respectively, to acknowledgment input ports 2463, 2473, and 2483, respectively of the locks 246, 247, and 248, respectively. Acknowledgement output ports 2461, 2471, and 2481, of the locks 246, 247, and 248, respectively, are connected by lines 1130, 1131, and 1132, respectively to input ports 2952, 2953, and 2954, respectively, of the multiplexer 295.*

In a similar manner to that just discussed, the demultiplexer 282 and an associated multiplexer 294 are connected to the link 112. The link 112 connects to the input port 2821 of the demultiplexer 282 and to an output port 2941 of the multiplexer 294. Output ports 2822, 2823, and 2824 of the demultiplexer 282 are connected by lines 1120, 1121, and 1122, respectively, to packets input ports of locks 243, 244, and 245, respectively. Packet output ports of the locks 243, 244, and 245 are connected by lines 1100, 1101, and 1102, respectively to the packet inputs 2401, 2411, and 2421, respectively, of the nodes 240, 241, and 242, respectively. Corresponding acknowledgment outputs 2405, 2415, and 2425, respectively, of the nodes 240, 241, and 242, respectively, are connected by lines 1106, 1107, and 1108, respectively to acknowledgment inputs of the locks 243, 244, and 245, respectively. Acknowledgement output ports of the locks 243, 244, and 245 are connected by lines 1123, 1124, and 1125, respectively, to input ports 2942, 2943, and 2944, respectively, of the multiplexer 294.

Locks 223-225 similarly couple data inputs and corresponding acknowledgment outputs of the nodes 220-222, respectively, to the demultiplexer 280 and an associated multiplexer 292, and these are in turn connected to the link 110. And locks 226-228 couple other data inputs and corresponding acknowledgment outputs of the nodes 220-222, respectively, to the demultiplexer 281 and an associated multiplexer 293, which devices in turn connect to the link 111. Other nodes of the circuit pack 101 and of other circuit packs of the network 100 are similarly coupled to incoming links.

Further as shown in the example of FIGS. 3a-c, the multiplexer 287 and an associated demultiplexer 291 are connected to the link 122. The link 122 connects to the output port 2871 of the multiplexer 287 and to an input port 2911 of the demultiplexer 291. Input ports 2872, 2873, and 2874 of the multiplexer 287 are connected by lines 1220, 1221, and 1222, respectively, to the packet output ports 2732, 2742 and 2752, respectively, of the locks 273, 274, and 275, respectively. Packet input ports 2730, 2740, and 2750, of the locks 273, 274, and 275, respectively, are connected by lines 1200, 1201, and 1202, respectively, to packet outputs 2703, 2713, and 2723, respectively, of the nodes 270, 271, and 272, respectively. Corresponding acknowledgment inputs 2707, 2717, and 2727, respectively, of the nodes 270, 271, and 272, respectively, are connected by lines 1206, 1207, and 1208, respectively, to acknowledgment output ports 2731, 2741, and 2751, respectively, of the locks 273, 274, and 275, respectively. Acknowledgment input ports 2733, 2743, and 2753 of the locks 273, 274, and 275, respectively, are connected by lines 1223, 1224, and 1225, respectively, to output ports 2912, 2913, and 2914, respectively, of the demultiplexer 291.

In a similar manner to that just discussed, the multiplexer 288 and associated demultiplexer 292 are connected to the link 123. The link 123 connects to the output port 2881 of the multiplexer 288 and to an input port 2921 of the demultiplexer 292. Input ports 2882, 2883, and 2884 of the multiplexer 288 are connected by lines 1227, 1228, and 1229, respectively, to packet output ports of locks 276, 277, and 278, respectively. Packet input ports of the locks 276, 277, and 278 are connected by lines 1203, 1204, and 1205, respectively, to the packet outputs 2704, 2714, and 2724, respectively, of the nodes 270, 271, and 272, respectively. Corresponding acknowledgment inputs 2708, 2718 and 2728, respectively, of the nodes 270, 271, and 272, respectively, are connected by lines 1209, 1210, and 1211, respectively, to acknowledgment output ports of the locks 276, 277, and 278, respectively. Acknowledgment input ports of the locks 276, 277, and 278 are connected by lines 1230, 1231, 1232, respectively, to output ports 2922, 2923, and 2924, respectively, of the demultiplexer 292.

Locks 263–265 similarly couple data outputs and corresponding acknowledgment inputs of the nodes 260–262, respectively, to the multiplexer 285 and associated demultiplexer 289, and these are in turn connected to the link 120. And locks 266–268 couple other data outputs and corresponding acknowledgment inputs of the nodes 260–262, respectively, to the multiplexer 286 and associated demultiplexer 290, which devices in turn connect to the link 121. Other nodes of the circuit pack 101 and of other circuit packs of the network 100 are similarly coupled to outgoing links.

Each lock is a mechanism that serves to alternate the permissible direction of transmission between the associated node and the associated multiplexer and demultiplexer. The set of three locks that are associated with, i.e., connected to, each multiplexer and demultiplexer pair are synchronized and operate in unison. In this manner these locks cyclically "turn around" the associated link, allowing signal transmissions to proceed over the link in one direction at one instant of time and in the other direction at the next instant of time. The duration of each instant of time is one bit time. Hence the locks serve to alternate transmission of a multiplexed packet data signal in one direction with transmission of a multiplexed acknowledgment signal in the other direction on the associated link.

Figure 8:
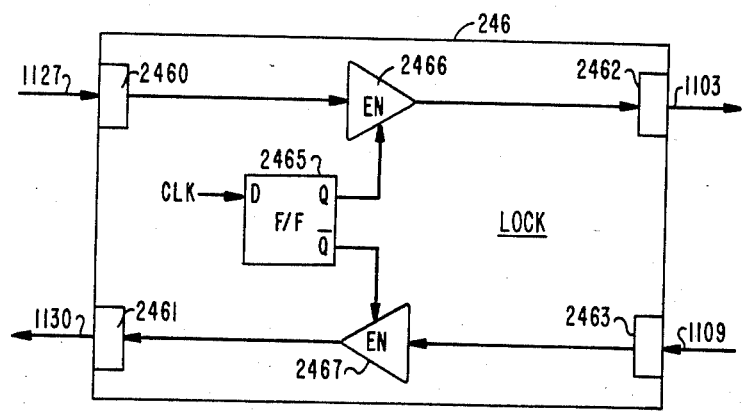
FIG. 8 is a circuit diagram of a lock of FIGS. 3a-c.
Figure 9:
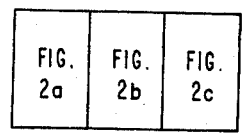
FIG. 9 indicates the proper arrangement of FIGS. 2a-c to form a complete diagram.
Figure 10:
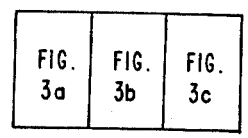
FIG. 10 indicates the proper arrangement of FIGS. 3a-c to form a complete diagram.

All of the locks in the network 100 are identical. Lock 246, taken to be representative of all locks, is diagrammed in FIG. 8. As FIG. 8 shows, the lock 246 comprises a toggle flip-flop 2465 and a pair of gated line drivers 2466 and 2467. The line driver 2466 has its line input connected to the packet data input port 2460 of the lock 246 and has its line output connected to the packet data output port 2462 of the lock 246. The ENABLE (EN) input of the driver 2466 is connected to the Q output of the flip-flop 2465. The line driver 2467 has its line input connected to the acknowledgment input port 2463 of the lock 246 and has its line output connected to the acknowledgment output port 2461 of the lock 246. The ENABLE (EN) input of the driver 2467 is connected to the $\overline{Q}$ output of the flip-flop 2465. The toggle flip-flop 2465 is a conventional D-type flip-flop whose D input is connected to a source of clock signals (CLK). The duration of the clock signal is two times the bit time 400 of FIG. 5.

During one half of the clock signal, while the clock signal is high, the Q output of the flip-flop 2465 is high and its $\overline{Q}$ output is low. Hence the driver 2466 is enabled and connects the port 2460 with the port 2462, while the driver 2467 is disabled and disconnects the port 2463 from the port 2461. Thus packet signal transmissions are allowed to pass from the demultiplexer 283 to the node 240, but acknowledgment signal transmissions are disabled from passing from the node 240 to the multiplexer 295.

During the second half of the clock cycle, while the clock signal is low, the Q output of the flip-flop 2465 is low and its $\overline{Q}$ output is high—the opposite of the states in which these outputs were during the first half of the clock cycle. Hence the driver 2466 is disabled and disconnects the port 2460 from the port 2462, while the driver 2467 is enabled and connects the port 2461 with the port 2463. Thus packet signal transmissions are disabled from passing from the demultiplexer 283 to the node 240, but acknowledgment signal transmissions are allowed to pass from the node 240 to the multiplexer 295.

Each set of three locks associated with a multiplexer and demultiplexer pair has a common source of clock signals. The operation of the locks of a set is thus synchronized. Hence the lock 246 is connected to the same CLK line as the locks 247 and 248. The locks 246–248 are thus caused to operate in unison. During the first half of the clock cycle, when the clock signal is high, the locks 246–248 allow the three bits, each of a different packet, that were demultiplexed by the demultiplexer 283 from a single received multiplex signal to pass to the three nodes 240–242, respectively. During the second half of the clock cycle, when the clock signal is low, the locks 246–248 allow three acknowledgment signal bits, one from each of the nodes 240–242, respectively, to pass to the multiplexer 295 for being multiplexed into a single multiplexed acknowledgment signal. If a node is not issuing an acknowledgment signal at the time, for example because it has not yet received all bits of a packet, the default, or idle, value of zero is passed to the multiplexer 295. The multiplexer 295 multiplexes the three acknowledgment bits into a single multiplexed acknowledgment signal and transmits the multiplexed signal on the link 113.

At the other end of the link 113, a demultiplexer receives the multiplexed acknowledgment signal and demultiplexes it into the three component acknowledgment bits. These bits are then coupled to the associated devices, such as the nodes of a set of nodes, by the associated set of locks. If one or more of these nodes is not ready to receive an acknowledgment signal at this time, for example because it has not yet completed transmitting all bits of a packet, that node simply ignores the acknowledgment bit, which at this time has the idle value of zero.

Of course, various changes and modifications to the illustrative embodiments described above will be apparent to those skilled in the art. For example, fewer or more than three bits may be multiplexed into a single multiplexed signal. Hence fewer or more than three nodes may be included in a node set and operated in parallel. A bit multiplexing scheme other than pulse-width modulation may be used. Or switching nodes having as few as one packet signal input may be used. Likewise, switching nodes having more than two packet signal inputs and outputs may be used. Furthermore, such nodes need not have physically separate packet inputs and acknowledgment outputs or packet outputs and acknowledgment inputs, and hence separate lines need not be used for the transmission of packet signals and acknowledgment signals. Rather, packet inputs and outputs may be only logically distinguished from, but physically the same as, associated acknowledgment outputs and inputs, respectively, and hence a single line may carry packet signals in one direction and acknowledgment signals in the other direction. And the various devices, such as multiplexers, demultiplexers, and locks, may be implemented differently from the manner disclosed. Such changes and modifications can be made without departing from the spirit and the scope of the invention and without diminishing its attendant advantages. It is therefore intended that such changes and modifications be covered by the following claims.

What is claimed is:

1. A switching network comprising at least one arrangement of switching nodes and a plurality of signal transmission links connected to the at least one arrangement, each arrangement comprising:

a plurality of signal switching nodes, each node having at least one signal input, and a plurality of signal outputs;

at least one demultiplexer each having an input port connected to a link for receiving a multiplexed stream of signals and having a plurality of output ports each coupled to an input of a node for transmitting to each coupled node input a substream of signals demultiplexed from the received stream; and at least one multiplexer each having a plurality of input ports each coupled to an output of a node for receiving from each coupled node output a signal substream, and having an output port connected to a link for transmitting a signal stream multiplexed from the plurality of received substreams; wherein each signal substream comprises a plurality of serial signals each representing the value of a bit; and wherein each multiplexed signal stream comprises a plurality of pulse-width modulated signals each representing the value of a plurlaity of bits.

2. A packet switching network comprising at least one arrangment of switching nodes and a plurality of signal transmission links connected to the at least one arrangement, each arrangement comprising:

a plurality of sets of packet switching nodes, the nodes of each set operating in parallel, each node having a plurality of inputs and a plurality of outputs to form with the inputs and outputs, repsectively, of other nodes of the set a plurality of input sets and a plurality of output sets, respectively, each node for selectively switching connections between its inputs and outputs, certain sets of nodes having the sets of outputs connected to the sets of inputs of other sets of nodes to form a packet switching matrix;

a plurality of demultiplexers each having an input port connected to a link for receiving a signal stream and having a plurality of output ports coupled to a set of inputs of a set of nodes, each output port for transmitting to the coupled input a signal substream demultiplexed from the received signal stream;

a plurality of multiplexers each having a plurality of input ports coupled to a set of outputs of a set of nodes, each input port for receiving from the coupled output a signal substream, and having an output port connected to a link for transmitting a signal stream multiplexed from the plurality of received signal substreams;

at least one node of each set of nodes coupled to a demultiplexer having an acknowledgment output for transmitting thereon acknowledgment signals indicating readiness of the node to receive a signal substream, the acknowledgment output being coupled to the link that connects to the demultiplexer; and the nodes of each set of nodes coupled to a multiplexer having an acknowledgment input for receiving thereon acknowledgment signals, the acknowledgment input being coupled to the link that connects to the multiplexer.

3. The apparatus of claim 2 wherein
each signal substream comprises a plurality of serial signals each representing the value of a bit; and wherein
the multiplexed signal stream comprises a plurality of pulse-width modulated signals each representing the values of a plurality of bits.

4. A packet switching network comprising at least one arrangement of switching nodes and a plurality of signal transmission links connected to the at least one arrangement, each arrangement comprising:

a plurality of packet switching nodes, each node having at least one input of a first kind and an associated at least one output of a second kind and further having a plurality of outputs of a first kind and an associated plurality of inputs of a second kind, the inputs of the first kind and the outputs of the second kind of certain nodes being connected to the outputs of the first kind and the inputs of a second kind, respectively, of other nodes to form a packet switching matrix;

a plurality of demultiplexers each having an input port connected to a link for receiving a stream of signals thereon and having a plurality of output ports each coupled to an input of a node, for transmitting to each coupled node input a substream of signals demultiplexed from the received stream, all output ports of a demultiplexer coupled to one kind of the first and the second kind of outputs;

a plurality of multiplexers, each associated with one of the plurality of demultiplexers and each having a plurality of input ports each coupled to an output of a node that is coupled to the associated demultiplexer, for receiving from each coupled node output a signal substream, all input ports of a multiplexer coupled to the other kind of the first and the second kind of outputs than the associated demultiplexer, each multiplexer further having an output port connected to the link that connects to the associated demultiplexer for transmitting thereon a signal stream multiplexed from the plurality of received substreams; and a plurality of sets of locks, the locks of a set acting in unison and each lock of a set connecting an output port of one demultiplexer to a node input of one kind alternately with connecting a node output of the other kind to the multiplexer associated with the one demultiplexer.

5. The apparatus of claim 4 wherein
the inputs and outputs of the first kind are packet signal inputs and outputs, respectively; and wherein
the inputs and outputs of the second kind are acknowledgment signal inputs and outputs, respectively, the acknowledgment signals indicating readiness of the node to receive, packet signals.

6. The apparatus of claim 4 wherein
each signal substream comprises a plurality of serial signals each representing the value of a bit; and wherein each multiplexed signal stream comprises a plurality of pulse-width modulated signals each representing the values of a plurality of bits.

7. A packet switching network comprising at least one arrangement of switching nodes and a plurality of signal transmission links connected to the at least one arrangement, each arrangement comprising:

a plurality of packet switching nodes, each node having a plurality of inputs and a plurality of outputs, each node for selectively switching connections between its inputs and outputs, the outputs of certain nodes being connected to the inputs of other nodes to form a packet switching matrix;

a plurality of packet demultiplexers each having an input port connected to a link for receiving thereon a packet signal stream and having a plurality of output ports coupled to inputs of a plurality of nodes, each output port for transmitting to the coupled input a packet signal substream demultiplexed from the input packet signal stream;

each node of the plurality of nodes coupled to a packet demultiplexer further having an acknowledgment output for transmitting thereon an acknowledgment signal substream indicating readiness of the node to receive a packet signal substream;

a plurality of acknowledgment multiplexers each having a plurality of input ports coupled to the plurality of acknowledgment outputs of the plurality of nodes that are coupled to one packet demultiplexer for receiving from the coupled acknowledgment output the acknowledgment signal substream and having an output port connected to the link that connects to the one packet demultiplexer for transmitting thereon an acknowledgment signal stream multiplexed from the received acknowledgment signal substreams;

a plurality of first sets of locks, the locks of a first set acting in unison and each lock of a first set connecting an output port of one packet demultiplexer to an input of a node alternately with connecting an acknowledgment output of the node to one acknowledgment multiplexer;

a plurality of packet multiplexers each having a plurality of input ports coupled to outputs of a plurality of nodes, each input port for receiving from the coupled output a packet signal substream, and having an output port connected to a link for transmitting thereon a packet signal stream multiplexed from the plurality of received packet signal substreams;

each node of the plurality of nodes coupled to a packet multiplexer further having an acknowledgment input for receiving thereon an acknowledgment signal substream;

a plurality of acknowledgment demultiplexers each having an input port connected to the link that connects to one packet multiplexer for receiving thereon a multiplexed acknowledgment signal stream, and having a plurality of output ports coupled to a plurality of acknowledgment inputs of the plurality of nodes that are coupled to the one packet multiplexer for transmitting to the coupled acknowledgment input an acknowledgment signal substream demultiplexed from the received multiplexed acknowlegment signal stream; and a plurality of second sets of locks, the locks of a second set acting in unison and each lock of a second set connecting an output of a node to an input port of one packet multiplexer alternately with connecting an output port of one acknowledgment demultiplexer to the acknowledgement input of the node.

8. The apparatus of claim 7 wherein
each signal substream comprises a plurality of serial signals each representing the value of a bit; and wherein each multiplexed signal stream comprises a plurality of pulse-width modulated signals each representing the values of a plurality of bits.

9. An arrangement for connecting switching nodes to signal transmission links by a minimized number of contacts, comprising:

a plurality of signal switching nodes, each node having at least one signal input and a plurality of signal outputs;

at least one demultiplexer each having an input port connected to a link for receiving a multiplexed stream of signals and having a plurality of output ports each coupled to an input of a node for transmitting to each coupled node input a substream of signals demultiplexed from the received stream; and at least one multiplexer each having a plurality of input ports each coupled to an output of a node for receiving from each coupled node output a signal substream, and having an output port connected to a link for transmitting a signal stream multiplexed from the plurality of received substreams; wherein each signal substream comprises a plurality of serial signals each representing the value of a bit; and wherein each multiplexed signal stream comprises a plurality of pulse-width modulated signals each representing the values of a plurality of bits.

10. An arrangement for connecting switching nodes to signal transmission links by a minimized number of contacts, comprising:

a plurality of sets of packet switching nodes, the nodes of each set operating in parallel, each node having a plurality of inputs and a plurality of outputs to form with the inputs and outputs, respectively, of other nodes of the set a plurality of input sets and a plurality of output sets, respectively, each node for selectively switching connections between its inputs and outputs, certain sets of nodes having the sets of outputs connected to the sets of inputs of other sets of nodes;

a plurality of demultiplexers each having an input port connected to a link for receiving a signal stream and having a plurality of output ports coupled to a set of inputs of a set of nodes, each output port for transmitting to the coupled input a signal substream demultiplexed from the received signal stream;

a plurality of multiplexers each having a plurality of input ports coupled to a set of outputs of a set of nodes, each input port for receiving from the coupled output a signal substream, and having an output port connected to a link for transmitting a signal stream multiplexed from the plurality of received signal substreams;

at least one node of each set of nodes coupled to a demultiplexer having an acknowledgment output for transmitting thereon acknowledgment signals indicating readiness of the node to receive a signal substream, the acknowledgment output being coupled to the link that connects to the demultiplexer; and the nodes of each set of nodes coupled to a multiplexer furrher having an acknowledgment input for receiving therein acknowledgment signals, the acknowledgment input being coupled to the link that connects to the multiplexer.

11. The apparatus of claim 10 wherein each signal substream comprises a plurality of serial signals each representing the value of a bit; and wherein the multiplexed signal stream comprises a plurality of pulse-width modulated signals each representing the values of a plurality of bits.

12. An arrangement for connecting switching nodes to signal transmission links by a minimized number of contacts, comprising:

a plurality of packet switching nodes, each node having at least one input of a first kind and an associated at least one output of a second kind and further having a plurality of outputs of a first kind and an associated plurality of inputs of a second kind, the inputs of the first kind and the outputs of the second kind of certain nodes being connected to the outputs of the first kind and the inputs of a second kind, respectively, of other nodes to form a packet switching matrix;

a plurality of demultiplexers each having an input port connected to a link for receiving a stream of signals thereon and having a plurality of output ports each coupled to an input of a node, for transmitting to each coupled node input a substream of signals demultiplexed from the received stream, all output ports of a demultiplexer coupled to one kind of the first and the second kind of outputs;

a plurality of multiplexers, each associated with one of the plurality of demultiplexers and each having a plurality of input ports each coupled to an output of a node that is coupled to the associated demultiplexer for receiving from each coupled node output a signal substream, all input ports of a multiplexer coupled to the other kind of the first and the second kind of outputs than the associated demultiplexer, each multiplexer further having an output port connected to the link that connects to the associated demultiplexer for transmitting thereon a signal stream multiplexed from the plurality of received substreams; and a plurality of sets of locks, the locks of a set acting in unison and each lock of a set connecting an output port of one demultiplexer to a node input of one kind alternately with connecting a node output of the other kind to the multiplexer associated with the one demultiplexer.

13. The apparatus of claim 12 wherein the inputs and outputs of the first kind are packet signal inputs and outputs, respectively; and wherein the inputs and outputs of the second kind are acknowledgment signal inputs and outputs, respectively, the acknowledgment signals indicating readiness of the node to receive packet signals.

14. The apparatus of claim 12 wherein each signal substream comprises a plurality of serial signals each representing the value of a bit; and wherein each multiplexed signal stream comprises a plurality of pulse-width modulated signals each representing the values of a plurality of bits.

15. An arrangement for connecting switching nodes to signal transmission links by a minimized number of contacts, comprising:

a plurality of packet switching nodes, each node having a plurality of inputs and a plurality of outputs, each node for selectively switching connections between its inputs and outputs, the outputs of certain nodes being connected to the inputs of other nodes to form a packet switching matrix;

a plurality of packet demultiplexers each having an input port connected to a link for receiving thereon a packet signal stream and having a plurality of output ports coupled to inputs of a plurality of nodes, each output port for transmitting to the coupled input a packet signal substream demultiplexed from the input packet signal stream;

each node of the plurality of nodes coupled to a packet demultiplexer further having an acknowledgment output for transmitting thereon an acknowledgment signal substream indicating readiness of the node to receive a packet signal substream;

a plurality of acknowledgment multiplexers each having a plurality of input ports coupled to the plurality of acknowledgment outputs of the plurality of nodes that are coupled to one packet demultiplexer for receiving from the coupled acknowledgment output the acknowledgment signal substream and having an output port connected to the link that connects to the one packet demultiplexer for transmitting thereon an acknowledgment signal stream multiplexed from the received acknowledgment signal substreams;

a plurality of first sets of locks, the locks of a first set acting in unison, each lock of a first set connecting an output port of one packet demultiplexer to an input of a node alternately with connecting an acknowledgment output of the node to one acknowledgment multiplexer;

a plurality of packet multiplexers each having a plurality of input ports coupled to outputs of a plurality of nodes, each input port for receiving from the coupled output a packet signal substream, and having an output port connected to a link for transmitting thereon a packet signal stream multiplexed from the plurality of received packet signal substreams;

each node of the plurality of nodes coupled to a packet multiplexer further having an acknowledgment input for receiving thereon an acknowledgment signal substream;

a plurality of acknowledgment demultiplexers each having an input port connected to the link that connects to one packet multiplexer for receiving thereon a multiplexed acknowledgment signal stream, and having a plurality of output ports coupled to a plurality of acknowledgment inputs of the plurality of nodes that are coupled to the one packet multiplexer for transmitting to the coupled acknowledgment input an acknowledgment signal substream demultiplexed from the received multiplexed acknowledgment signal stream; and a plurality of second sets of locks, the locks of a second set acting in unison and each lock of a second set connecting an output of a node to an input port of one packet multiplexer alternately with connecting an output port of one acknowledgment demultiplexer to the acknowledgment input of the node.

16. The apparatus of claim 15 wherein each signal substream comprises a plurality of serial signals each representing the value of a bit; and wherein each multiplexed signal stream comprises a plurality of pulse-width modulated signals each representing the values of a plurality of bits.

* * * * *

UNITED STATES PATENT AND TRADEMARK OFFICE
CERTIFICATE OF CORRECTION

PATENT NO. : 4,577,308

DATED : March 18, 1986

INVENTOR(S) : Mikiel L. Larson, et al

It is certified that error appears in the above-identified patent and that said Letters Patent is hereby corrected as shown below:

Column 22, line 65, "receive,packet" should read --receive packet--.

Column 25, line 4, furrher" should read --further--.

Column 25, line 5, "therein" should read --theron--.

Signed and Sealed this

Seventeenth Day of November, 1992

Attest:

DOUGLAS B. COMER

Attesting Officer

Acting Commissioner of Patents and Trademarks